US012576989B1

(12) United States Patent
Rogers et al.

(10) Patent No.: US 12,576,989 B1
(45) Date of Patent: Mar. 17, 2026

(54) METHODS AND DEVICES FOR ALIGNMENT AND JOINING LARGE COMPONENTS

(71) Applicant: Relativity Space, Inc., Long Beach, CA (US)

(72) Inventors: Jared Rogers, Long Beach, CA (US); Samuel Butler, Long Beach, CA (US); Elizabeth Barranco, Long Beach, CA (US); Adam Bermudez, Long Beach, CA (US); John Cummings, Long Beach, CA (US); Collin Cain, Long Beach, CA (US)

(73) Assignee: Relativity Space, Inc., Long Beach, CA (US)

( * ) Notice: Subject to any disclaimer, the term of this patent is extended or adjusted under 35 U.S.C. 154(b) by 0 days.

(21) Appl. No.: 19/195,599

(22) Filed: Apr. 30, 2025

Related U.S. Application Data

(60) Provisional application No. 63/717,726, filed on Nov. 7, 2024.

(51) Int. Cl.
| | |
|---|---|
| *B64F 5/10* | (2017.01) |
| *B23K 20/12* | (2006.01) |
| *B23K 101/18* | (2006.01) |

(52) U.S. Cl.
CPC ............. *B64F 5/10* (2017.01); *B23K 20/126* (2013.01); *B23K 20/129* (2013.01); *B23K 2101/18* (2018.08)

(58) Field of Classification Search
None
See application file for complete search history.

(56) References Cited

U.S. PATENT DOCUMENTS

| | | | | |
|---|---|---|---|---|
| 4,442,335 A | * | 4/1984 | Rossi | B23K 37/047 |
| | | | | 219/79 |
| 4,667,866 A | * | 5/1987 | Tobita | B62D 65/02 |
| | | | | 29/430 |
| 5,374,799 A | * | 12/1994 | Nishimoto | B62D 65/02 |
| | | | | 228/6.1 |
| 5,848,458 A | * | 12/1998 | Bullen | B23P 21/004 |
| | | | | 29/33 K |
| 6,170,732 B1 | * | 1/2001 | Vogt | B62D 65/00 |
| | | | | 219/652 |
| 6,293,454 B1 | * | 9/2001 | Zhang | B23K 37/047 |
| | | | | 219/80 |
| 8,132,329 B2 | * | 3/2012 | Halker | B60J 7/00 |
| | | | | 296/108 |
| 10,576,508 B2 | * | 3/2020 | Eitelhuber | B08B 1/30 |
| 11,933,039 B2 | * | 3/2024 | Vittadini | E04B 1/388 |
| 12,304,661 B2 | * | 5/2025 | Sui | B64F 5/50 |

(Continued)

OTHER PUBLICATIONS

Everyday Astronaut, "First Look Inside Blue Origin's New Glenn Factory w/ Jeff Bezos!", Youtube, Aug. 15, 2024, Retrieved from: https://www.youtube.com/watch?v=rsuqSn7ifpU on Oct. 10, 2025.

(Continued)

*Primary Examiner* — Devang R Patel
(74) *Attorney, Agent, or Firm* — KPPB LLP

(57) ABSTRACT

Methods, apparatus, and devices for fixturing and alignment of parts and panels for assembly into aerospace components, are provided. These methods and devices are designed for joining together several large part segments into a larger complete component.

12 Claims, 31 Drawing Sheets

(56) References Cited

U.S. PATENT DOCUMENTS

| | | | | |
|---|---|---|---|---|
| 2015/0013162 A1* | 1/2015 | Best | .......................... | B64F 5/50 |
| | | | | 248/122.1 |
| 2015/0314889 A1* | 11/2015 | Day | .......................... | B64F 5/10 |
| | | | | 408/69 |
| 2015/0314892 A1* | 11/2015 | DesJardien | ............... | B64F 5/10 |
| | | | | 29/559 |
| 2017/0157725 A1* | 6/2017 | Stone | ........................ | B64F 5/40 |

OTHER PUBLICATIONS

Smarteveryday, "How Rockets Are Made (Rocket Factory Tour—United Launch Alliance)—Smarter Every Day 231", Youtube, Feb. 29, 2020, Retrieved from: https://www.youtube.com/watch?v=o0fG_InVhHw on Oct. 10, 2025.

United Launch Alliance, "Vulcan: Production Update // Building the First Vulcan Centaur Rocket", Youtube, Feb. 21, 2022, Retrieved from: https://www.youtube.com/watch?v=t-P0xiJcXN4 on Oct. 10, 2025.

United Launch Alliance, "Vulcan: Production Update // Building the First Vulcan Centaur Rocket", Youtube, Jun. 25, 2020, Retrieved from: https://www.youtube.com/watch?v=fAmra8abfpc on Oct. 10, 2025.

* cited by examiner

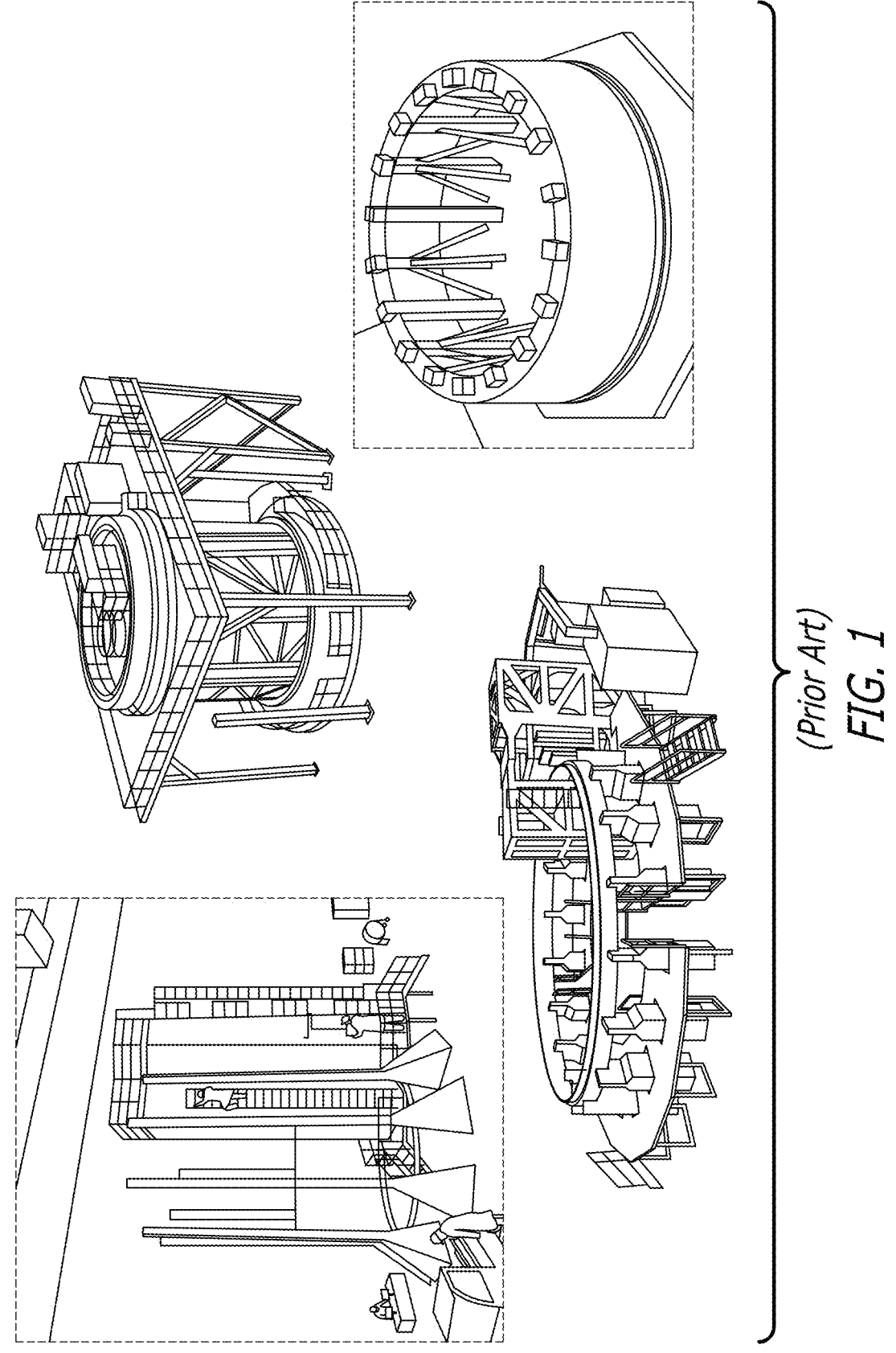

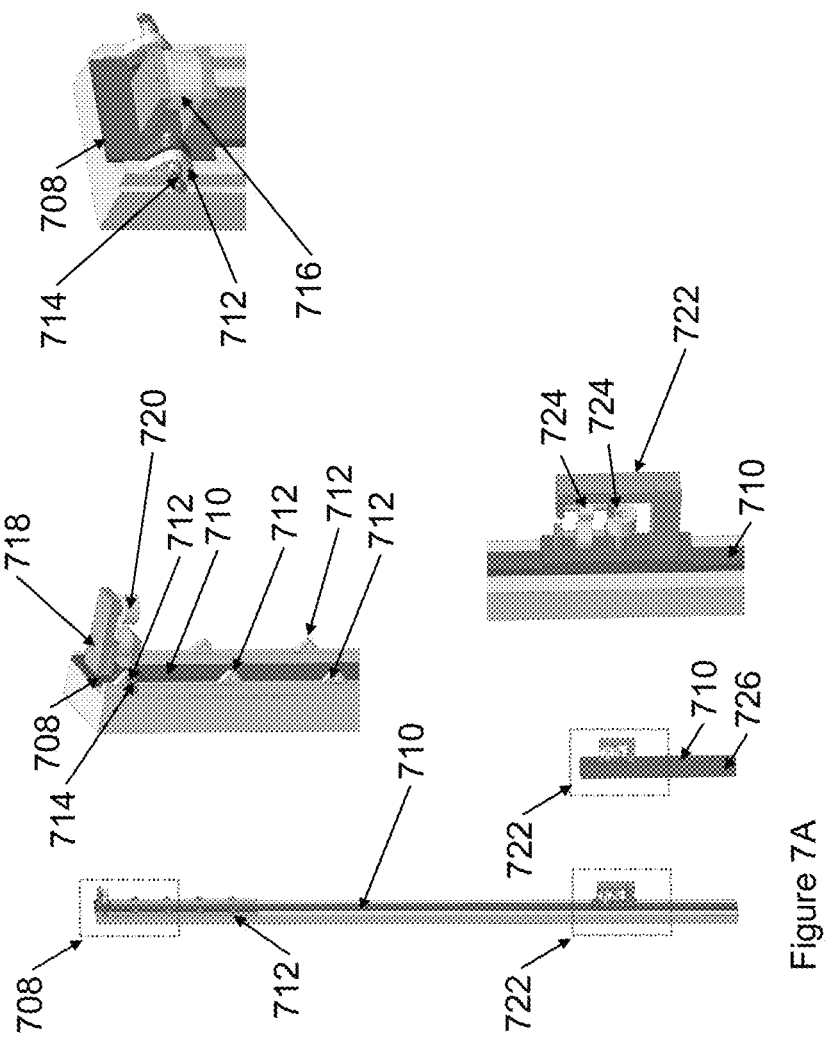
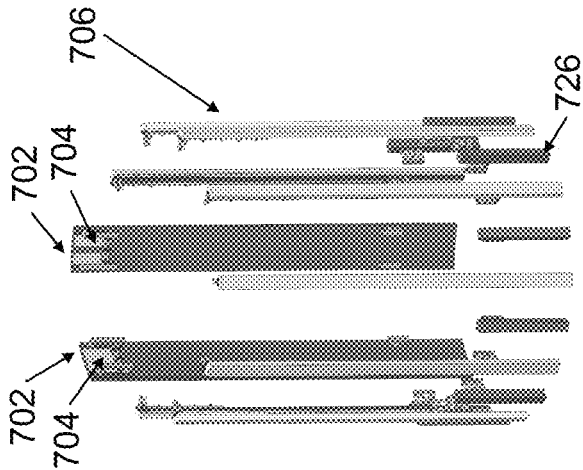
Figure 7A

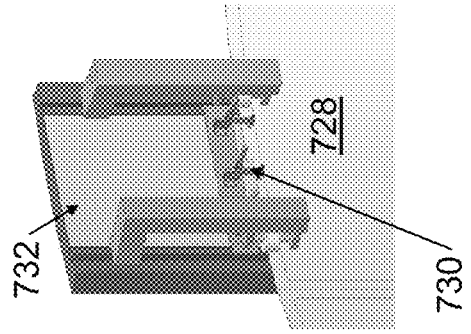
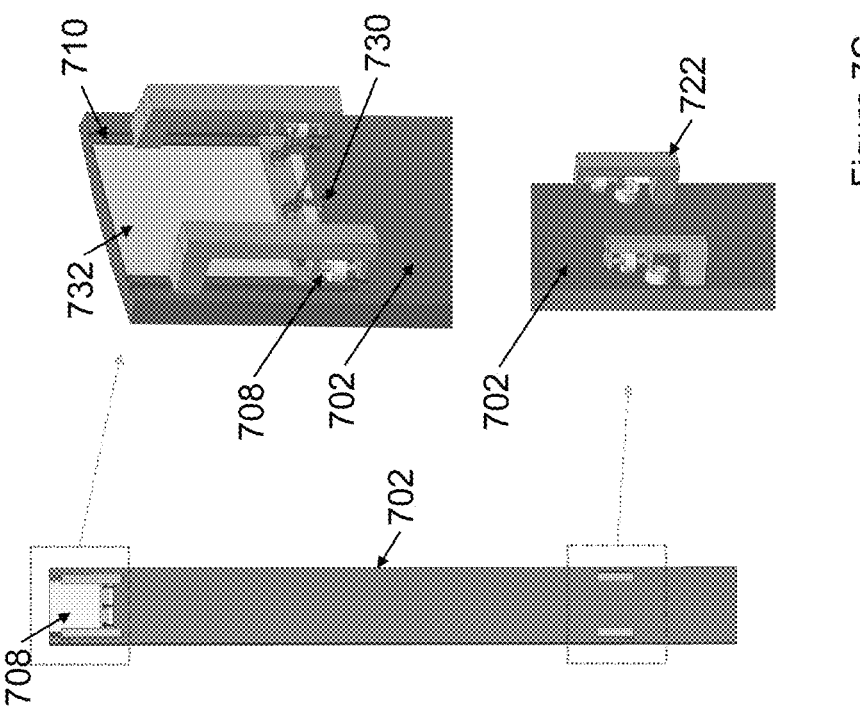
Figure 7C

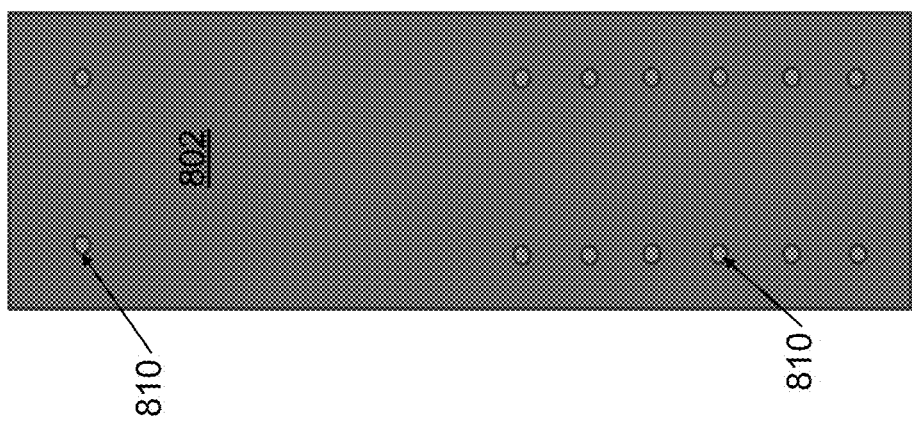
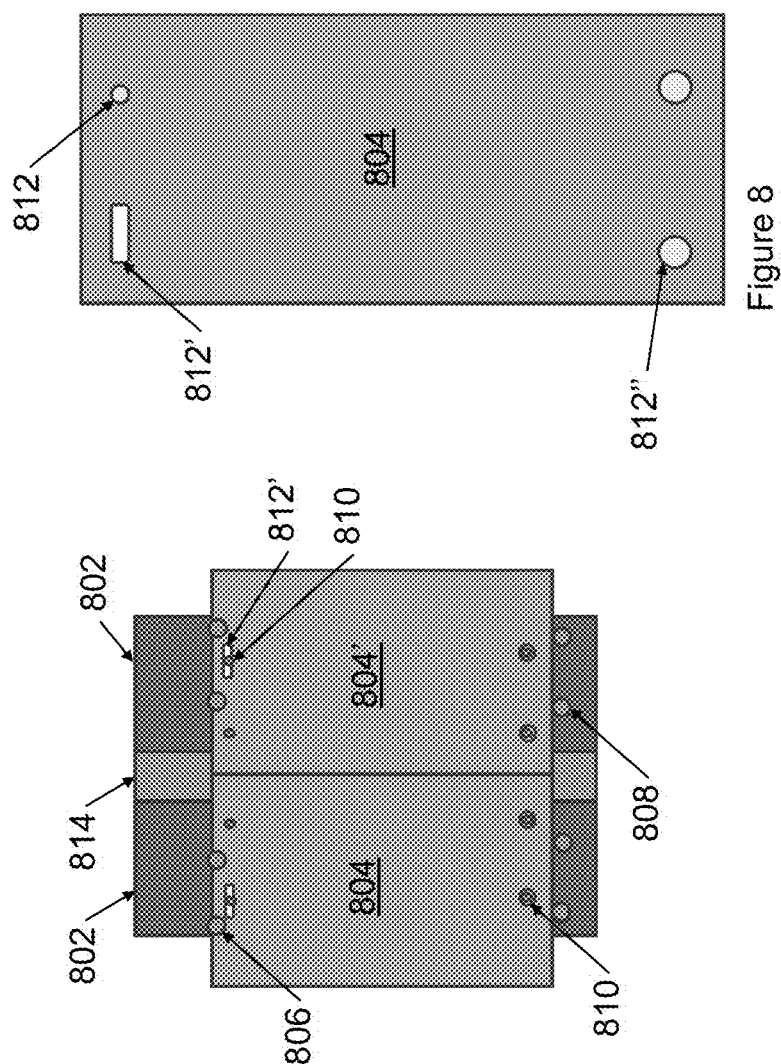
Figure 8

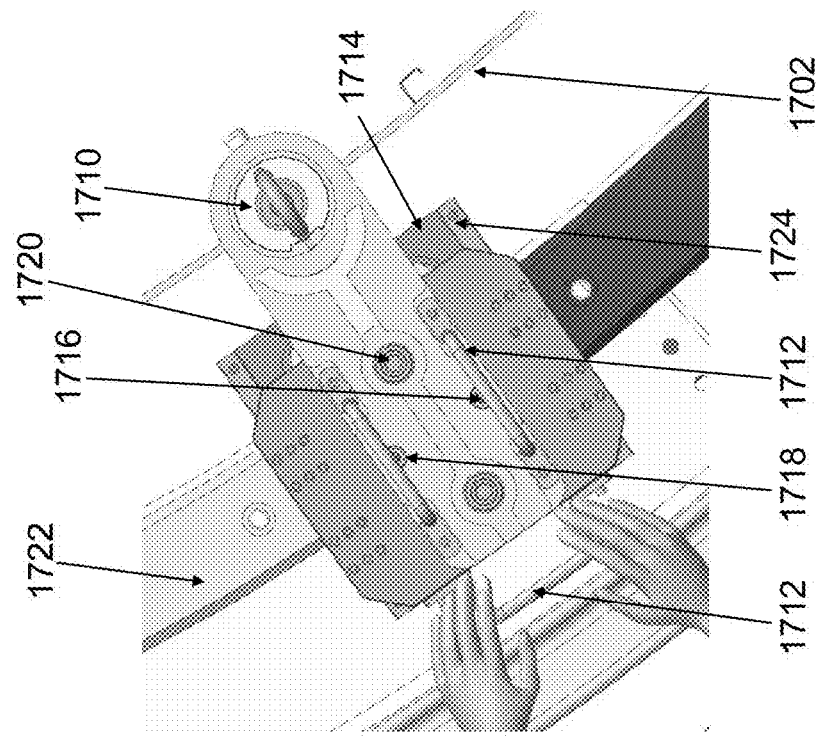
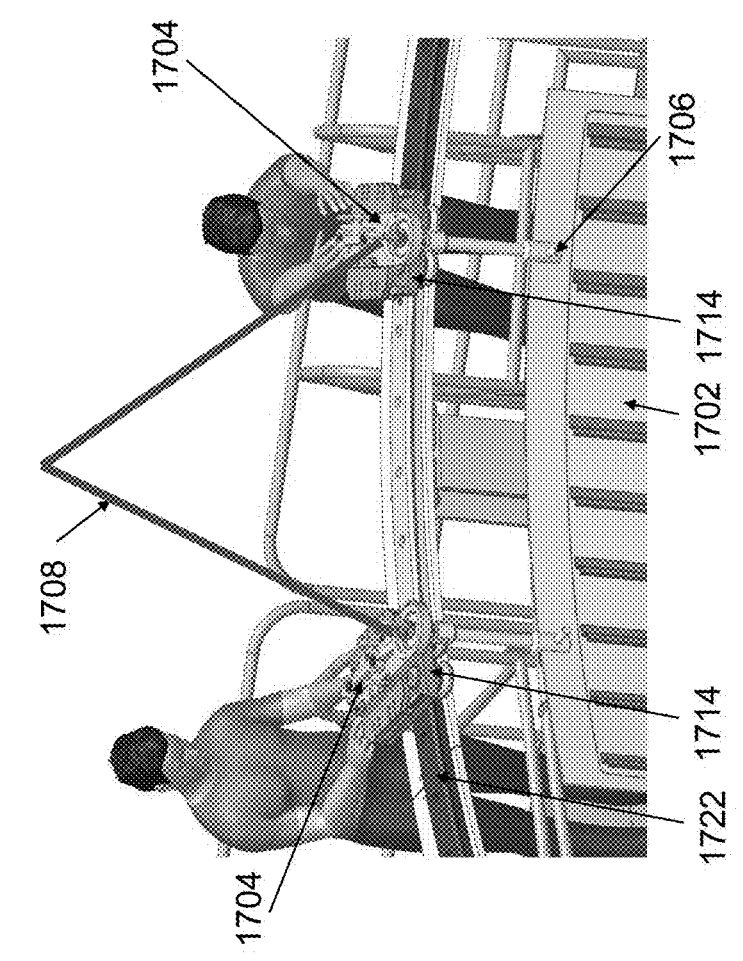
Figure 17A

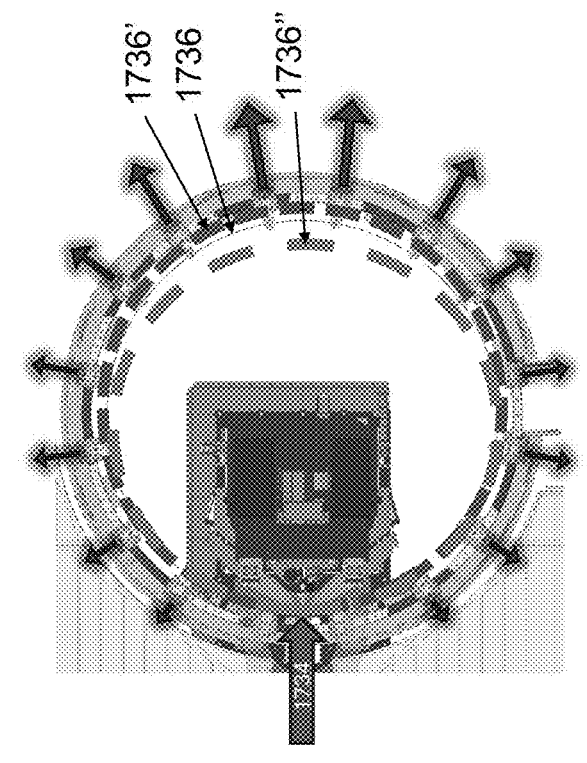
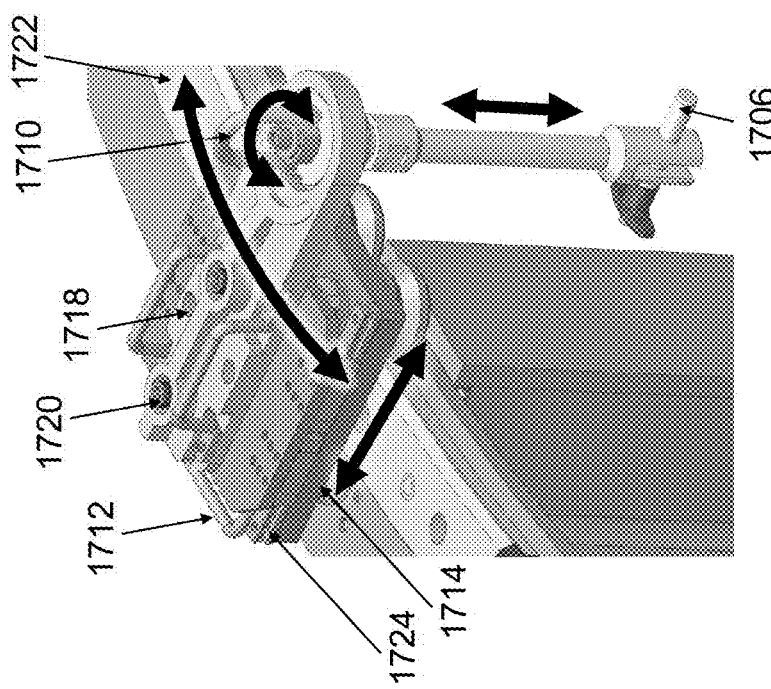
Figure 17B

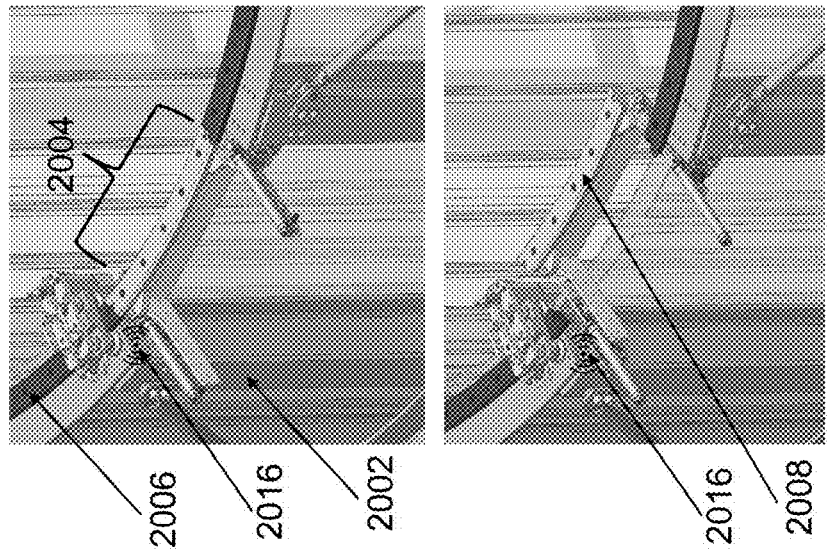
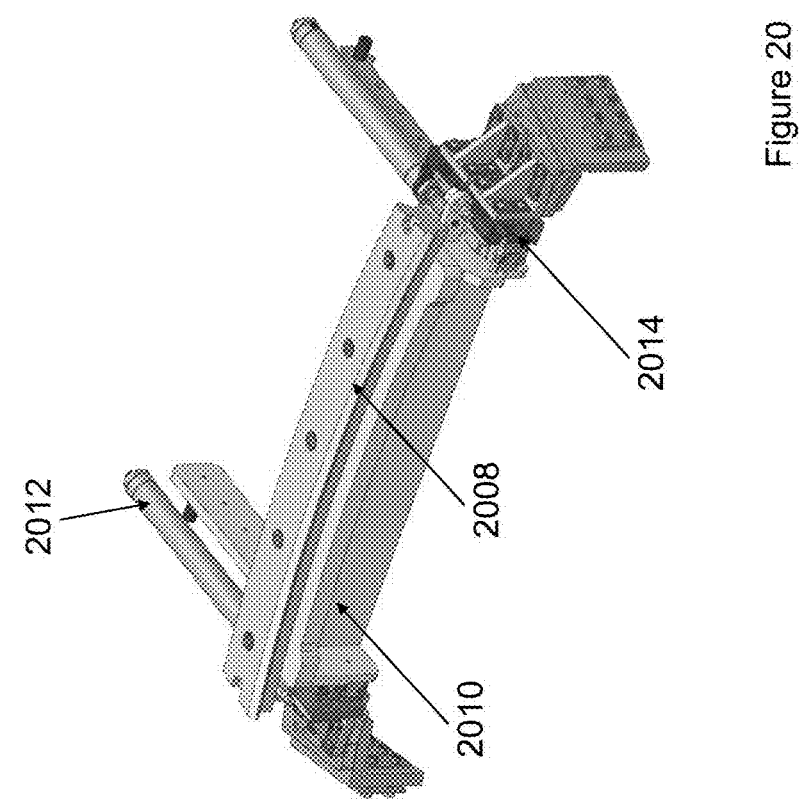
Figure 20

METHODS AND DEVICES FOR ALIGNMENT AND JOINING LARGE COMPONENTS

CROSS REFERENCE TO RELATED APPLICATIONS

The current application claims the benefit of U.S. Provisional Patent Application No. 63/717,726 entitled "Methods and Devices for Alignment and Joining Large Components" filed Nov. 7, 2024, the disclosure of which is incorporated herein by reference in its entirety.

FIELD OF THE INVENTION

This invention is generally related to methods and devices for fixturing and alignment of parts and panels for assembly into aerospace components, machined parts and devices, and methods thereof.

BACKGROUND

Friction Stir Welding (FSW) is a joining process that uses a rotating tool to fuse two adjacent workpieces. The process generates heat through friction between the tool and the materials, softening the areas close to the tool. As the tool moves along the joint line, it welds the pieces together, creating a weld with high strength, which makes FSW ideal for applications that require robust structural components, such as aerospace applications.

FSW does not require filler materials, which can result in lighter structures, which is an important consideration for aerospace applications, where weight reduction is a critical design factor. Additionally, FSW can produce welds with superior strength and consistency compared to alternative joining methods. However, FSW also poses several challenges, particularly when used for large aerospace components. One major challenge is fixturing and aligning large panels. Ensuring that these panels are correctly positioned and securely held during the welding process can be complex and labor-intensive. Even minor misalignments can lead to significant issues. In large structures, even slight deviations in alignment can combine to produce considerable errors, and the cumulative effect of the small misalignments across multiple panels can create significant deviations from design specifications.

SUMMARY OF THE INVENTION

Aspects of the disclosure are directed to methods and devices for friction stir welding and part fixturing.

Additional embodiments and features are in part set forth in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which include various embodiments of the disclosure and should not be construed as a complete recitation of the scope of the disclosure, wherein:

FIG. 1 illustrates barrel manufacturing methods and fixturing devices in accordance with various aspects of the prior art.

FIGS. 7A through 7D illustrate a clamping alignment and fixturing configuration in accordance with some embodiments.

FIG. 8 illustrates a slotted panel alignment and fixturing configuration in accordance with some embodiments.

FIGS. 17A through 17C illustrate loading and aligning panels and brackets in accordance with some embodiments.

FIG. 20 illustrates an example removable rail section in accordance with some embodiments.

DETAILED DESCRIPTION

Figure 2A:
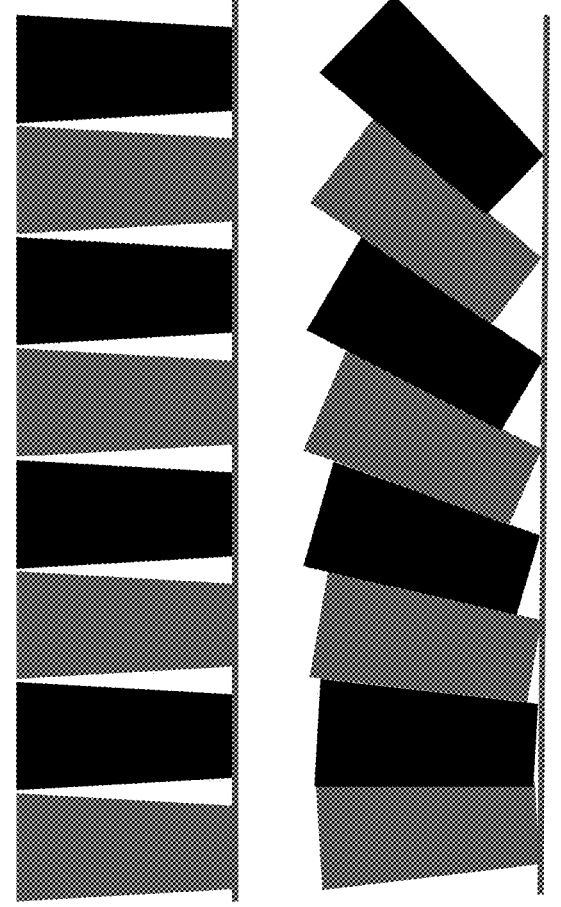
FIGS. 2A through 2C illustrate common manufacturing and alignment errors in accordance with some embodiments.

It will be understood that the components of the embodiments, as generally described herein and illustrated in the appended figures, may be arranged and designed in a variety of different configurations. Thus, the following more detailed description of various embodiments, as represented in the figures, is not intended to limit the scope of the present disclosure but is merely representative of various embodiments. While various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages and similar language throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may but do not necessarily, all refer to the same embodiment.

Friction Stir Welding (FSW) is a welding technique used to join two metal parts. In this process, the components are positioned side by side, ensuring a tight fit at their edges. A specially designed tool, often referred to as the pin, is aligned with the components, by use of a laser pointer mounted in the spindle before the pin is installed therein, or by use of multiple laser pointers arranged around the spindle before or even after the pin is installed therein, for example. Then, the pin is then applied to the interface of the materials with intense force. In many applications, the force often exceeds thousands of pounds. As the pin rotates and moves along the joint, it generates frictional heat, which softens the material without reaching its melting point. This softening allows the metal to be stirred and mechanically mixed at the interface. The pin's action creates a plastic flow of the material, facilitating bonding between the two panels. The result is a strong, solid-state butt weld that boasts exceptional integrity and minimal thermal distortion, making FSW a preferred method for joining various metals in applications ranging from aerospace to automotive industries, such as combining panels together to form a barrel section of a rocket. However, it should be understood that the fixturing techniques described herein can be used with other joining techniques besides FSW, such as arc welding, gas welding, joiner plates, and other joining techniques that would be known to one skilled in the art. Embodiments using such other joining techniques might omit one or both of a weld tower or an anvil tower discussed herein, while otherwise retaining all other necessary fixturing features.

For many FSW applications, a weld tower is designed to exert a tremendous force of thousands of pounds, and positioned at the back of the weld tower is an anvil tower, which effectively reacts to this immense force, providing stability and support during the welding process. Additionally, a fixturing structure is employed to securely hold the part to be welded in place during the operation.

Numerous methods for fixturing parts have been developed that often depend on the unique operational requirements of the final parts. For example, in many barrel manufacturing applications, panels are placed directly on rollers situated along the circumferential beams, allowing them to be pushed and manipulated around the workstation and support them from below as illustrated by the prior art examples illustrated in FIG. 1. However, this approach has several limitations that can lead to complications, such as the weight of the panels causing the panels to buckle or collapse if not properly supported. To address these challenges, companies have developed a range of methods, procedures, and specialized tooling aimed at preventing such issues, some examples of which are illustrated in FIG. 1. In another example, some aerospace companies utilize horizontal fixturing for their large primary structures, which enhances stability. Fundamentally, the many methods attempt to address the same core problem: how to optimally fixture a large part without it collapsing under its own weight.

Ensuring that parts are properly secured and accurately aligned before the welding process is vital. Even minor misalignments, which may seem insignificant at first glance, can lead to considerable complications further into the assembly process. In the context of large structures, slight alignment issues can accumulate, compounding across subsequent panels and resulting in substantial errors. The cumulative effects of these small misalignments, when presented across multiple panels, can ultimately create significant deviations from the intended design specifications, potentially compromising the integrity of the entire project.

Figure 2B:
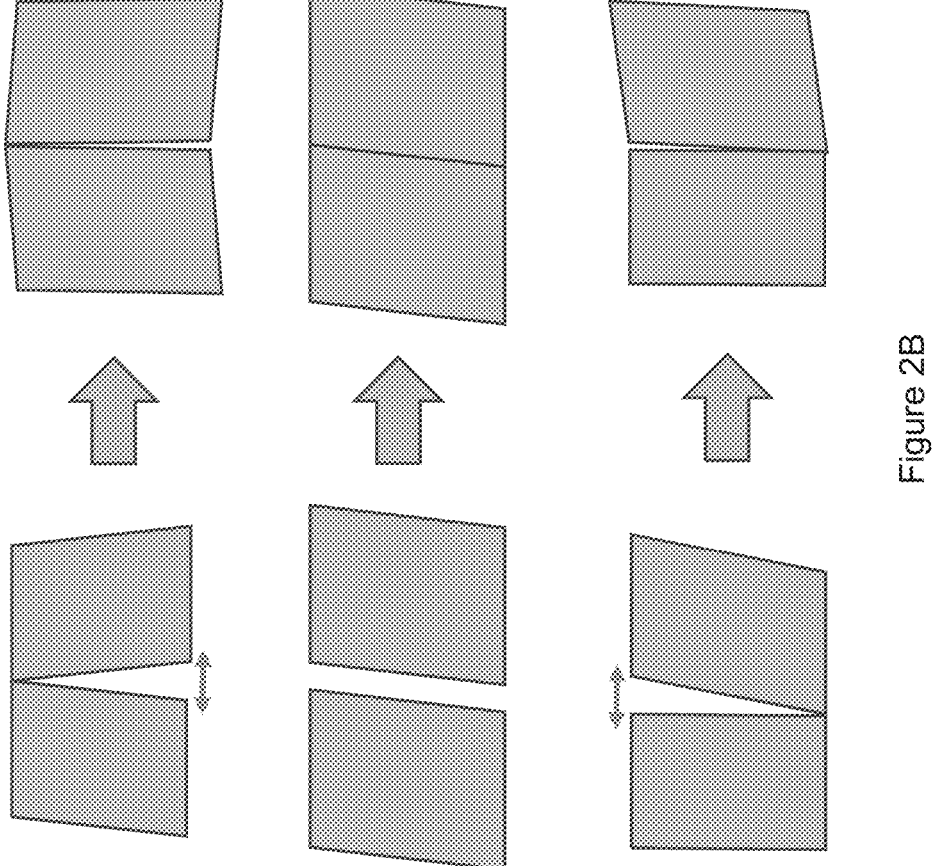
Figure 2C:
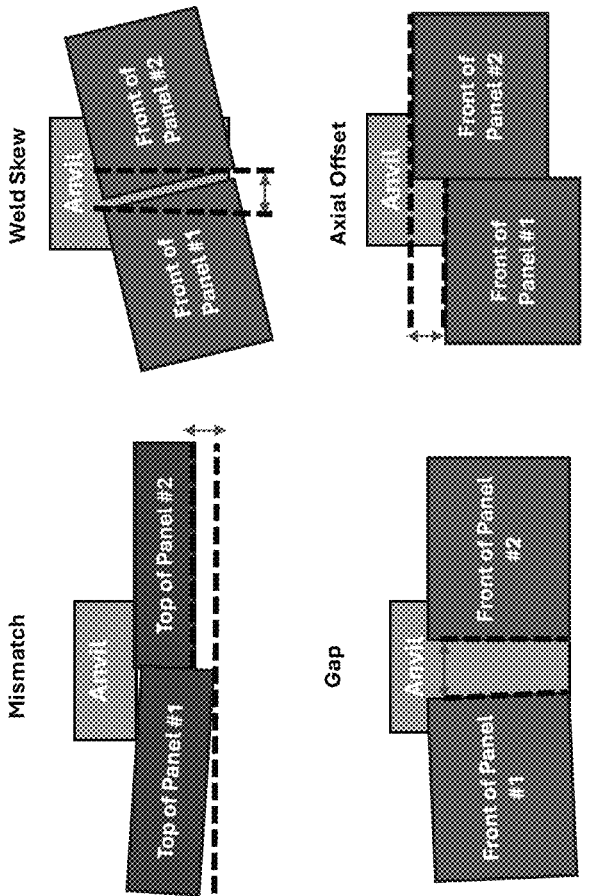

FIGS. 2A through 2C illustrate how small errors can compound. FIG. 2A illustrates an example where the panels have a manufacturing error in the form of a slight taper. As a result, the panels form a trapezoidal shape. Individually, the deviation is small; however, when the panels are joined together, the errors compound with each other, and the joined panels "corkscrew," resulting in significant misalignment and an unusable part. FIG. 2B illustrates how the improper alignment of panels, even in the absence of manufacturing defects, can result in misalignments. Misalignments that when compounded, can turn into substantial errors. FIG. 2C shows common alignment errors: mismatch, weld skew, gap, and axial offset. These errors can lead to compounded error problems and result in defective parts if not addressed.

Embodiments

Figure 3:
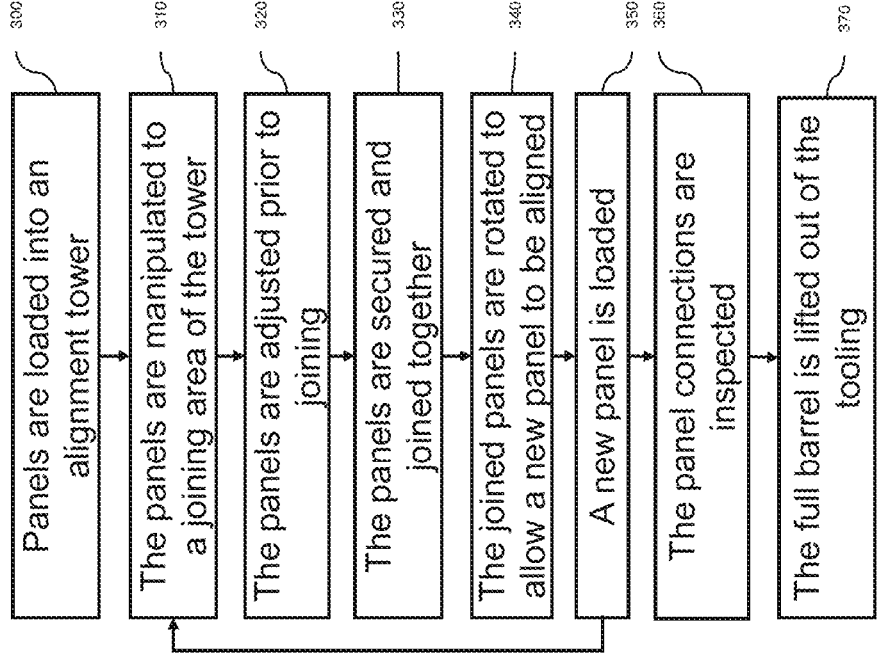
FIG. 3 depicts a flow chart for an example method of fixturing for a barrel in accordance with the disclosure.

Various embodiments of the invention are directed toward systems and devices for fixturing large parts for fabrication. FIG. 3 depicts a flow chart for an example method of fixturing for a barrel part in accordance with the disclosure. At step 300, panels are loaded into an alignment tower. At step 310, the panels are manipulated to a joining area of the tower, such as by translating them along a rail. At step 320, the position of the panels are adjusted prior to joining at the alignment towers, such as by rachet straps, turnbuckles, or other manual or motorized adjustment device. At step 330, the panels are secured and joined together, such as by vertical friction stir welding. However, it should be understood that the fixturing techniques described herein can be used with other joining techniques, such as arc welding, gas welding, joiner plates, and other joining techniques that would be known to one skilled in the art. At step 340, the joined panels are rotated to allow a new panel to be aligned for joining, such as by again translating them along the rail. At step 350, new panels are loaded in, and steps 310, 320, 330, and 340 are repeated. At step 360, the panel connections are inspected. In some embodiments, the inspection and joining are performed in parallel; for example, step 360 may be performed each time step 330 is completed, rather than after step 350, or step 360 can be performed concurrently on a first set of panels at a first connection while step 330 is performed add a new panel. In some embodiments, translating panels along the rail is accomplished by manual effort, while in other embodiments the translating is accomplished by motorized effort. For example, motorized winches can be used to manipulate panels to a joining area, rotate them to allow a new panel to be aligned for joining, or otherwise to translate them along the rail. At step 370, once the full barrel is achieved, the barrel is lifted out of the tooling.

Figure 4:
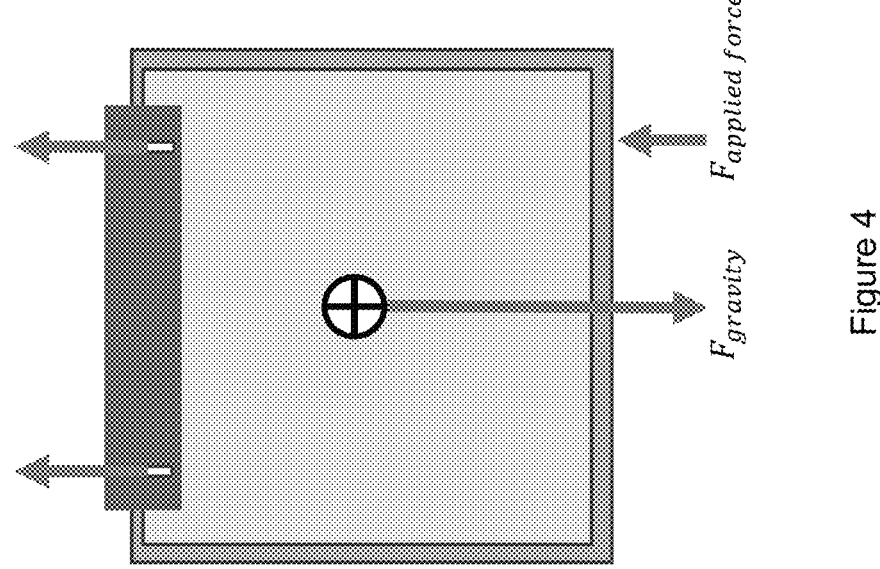
FIG. 4 illustrates fixturing configured to hang panels, in accordance with some embodiments.

In many embodiments, the fixturing is configured to hang panels, as illustrated in FIG. 4. In many embodiments, the fixturing is configured to prevent buckling and warping in the panels so that the panels hang freely. In many embodiments, gravity is utilized to stabilize the panel structure integrity. Many embodiments are configured so the force of gravity straightens the panel. In some embodiments, an applied force can be applied to the hung panel to align it with a complementary panel for joining. In many embodiments, the applied force can correct misalignments, such as mismatch, skew, gaps, and axial offsets. In many such embodiments, hanging panels enable panels of any length to be utilized. In many embodiments, the height of the panels is limited only by the height of the fixturing structure.

Figure 5:
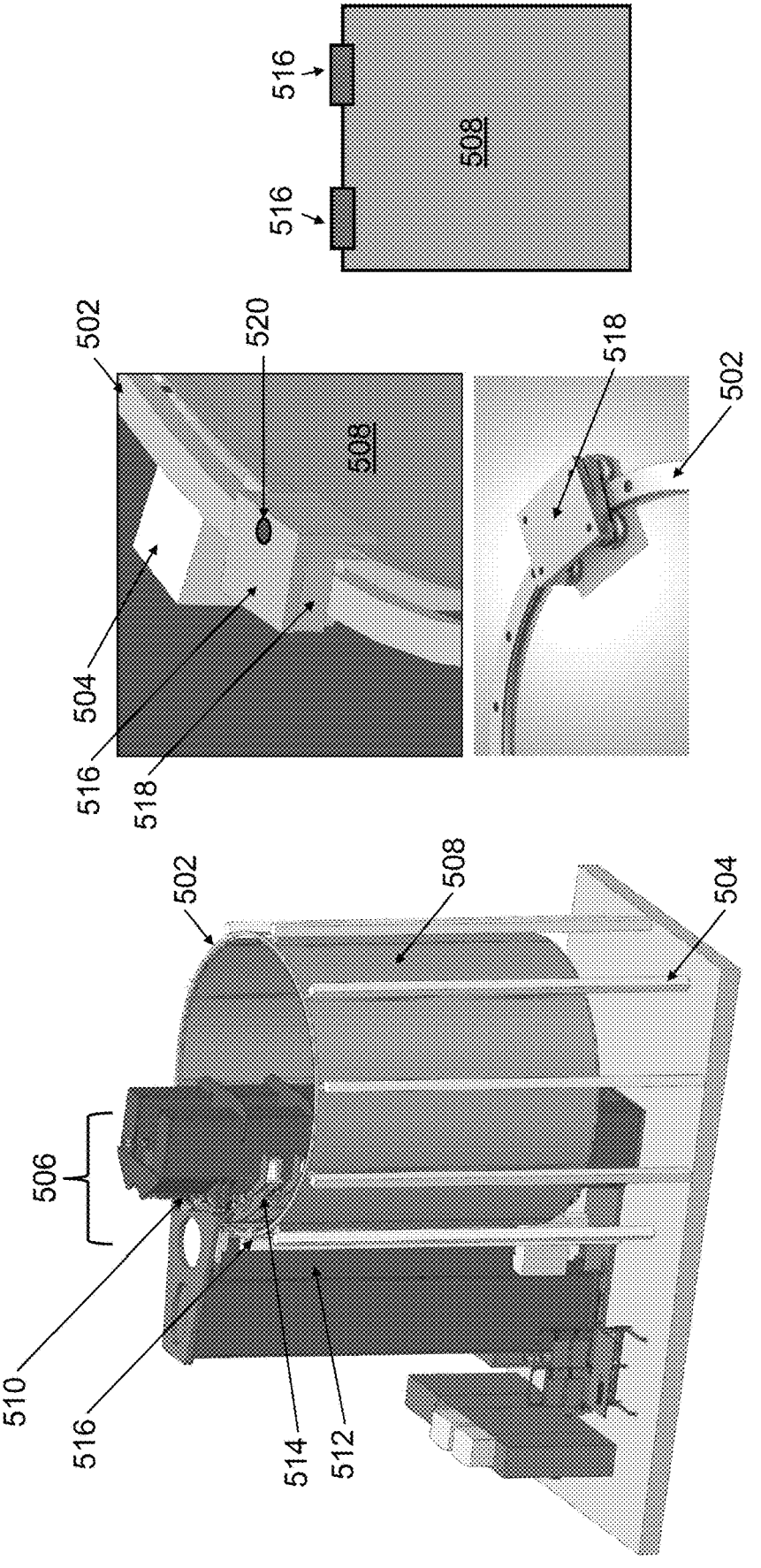
FIG. 5 illustrates fixturing towers, rail, and support elements in accordance with some embodiments.

FIG. 5 illustrates fixturing towers, rail, and support elements in accordance with some embodiments. In many embodiments, a rail 502 is installed at the top fixturing support towers 504 at the top of a fixturing structure that contains a joining and aligning area 506. In many embodiments, the rail 502 circumscribes the joining and alignment area 506. In many embodiments, the joining area 506 contains a welding system such as an FSW system that joins panels 508 with a weld head 510 and anvil tower 512. Many embodiments are configured with a constraint system 514, such as clamps and alignment elements 516, such as brackets that secure panels 508 in the joining area 506 so that panels can be joined together. In many such embodiments, several fixturing towers 504 are proximal to a joining area 506. In many such embodiments, the fixturing tower 502 is configured to align panels 508 together to avoid gapping, mismatch, and misalignment of the weld head 510 to the part. In many embodiments, the rail 502 is configured to encircle the circumference of the structure. In many embodiments, rail 502 is coupled with the alignment brackets 516, and the brackets 516 are coupled with the panels 508. In many such embodiments, brackets 516 are coupled to the top of panel 508. In many embodiments, the panels 508 are configured to hang from brackets 516 coupled to the rail 502. Many such embodiments are configured so that the panels 508 can be manipulated in a manner resembling how a shower curtain is hung. In many embodiments, mounting carts 518 are coupled to the rail 502. In many embodiments, the cart 518 is configured to translate along rail 502. In many embodiments, the carts 518 are configured to couple to the brackets 516. In many such embodiments, the carts 518 and the brackets 516 selectively couple together. In some embodiments, the brackets 516 are configured with a mounting point 520. In many such embodiments, the mounting point 520 is configured to couple with a crane or other lifting and manipulation device. In many such embodiments, the brackets 516 are coupled to panels 508, and a manipulation device manipulates the brackets 516 and coupled 508 panels onto carts 518. In many embodiments, the carts 518 and coupled brackets 516 and panel 508 are configured to translate along the rail 502 in a manner where the hung panels resemble a shower curtain.

Figure 6:
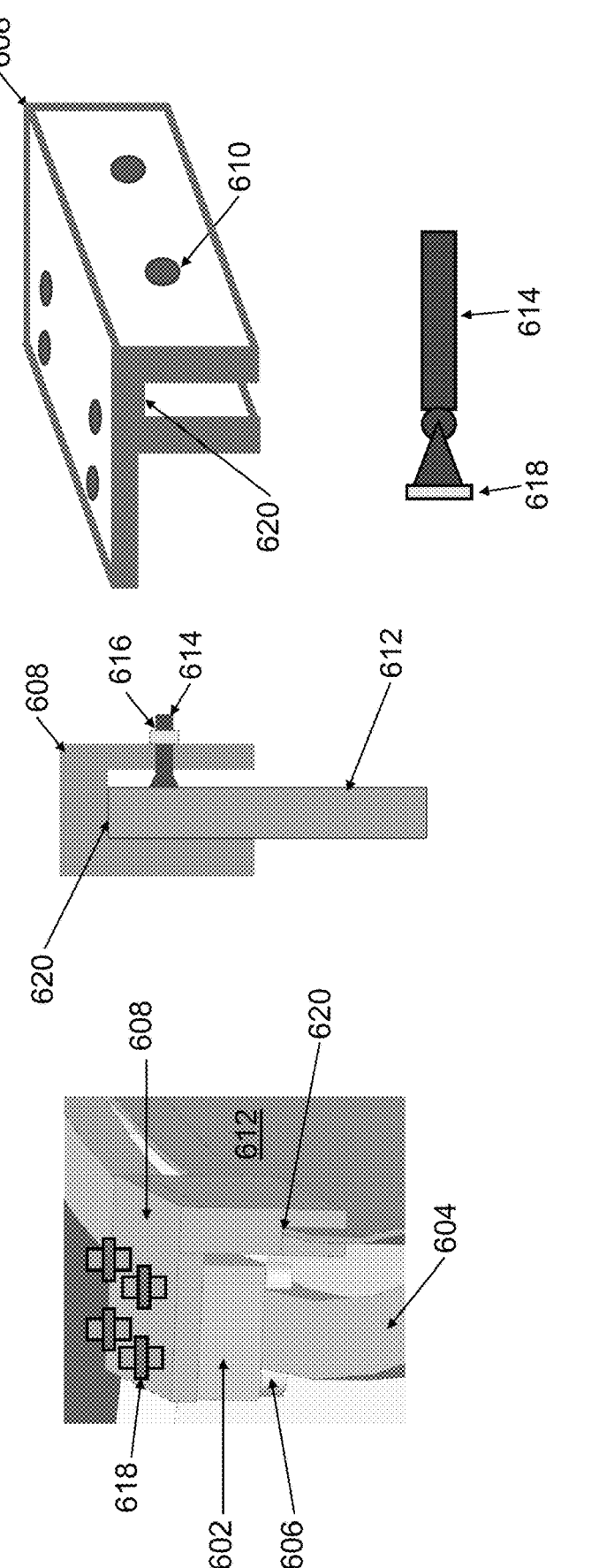
FIG. 6 illustrates a hanging alignment and fixturing configuration in accordance with some embodiments.
Figure 7B:
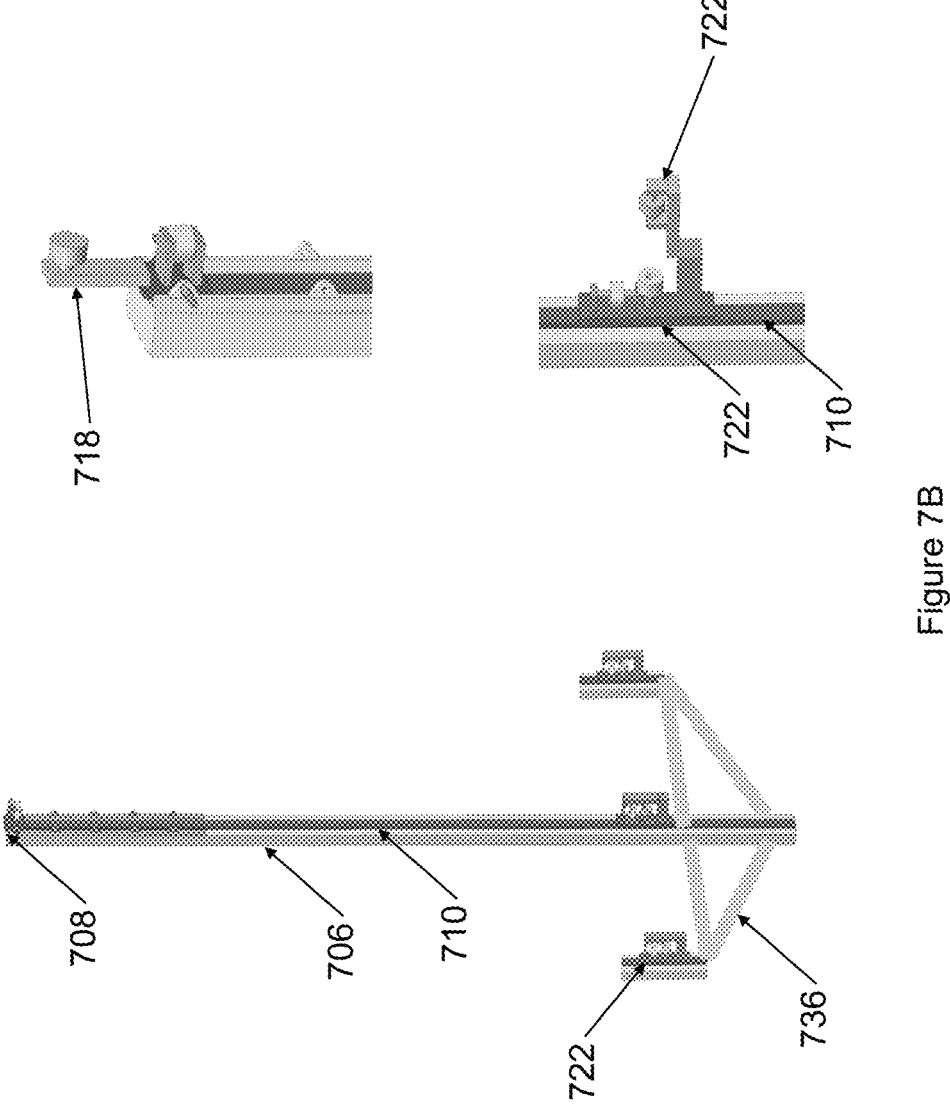
Figure 7D:
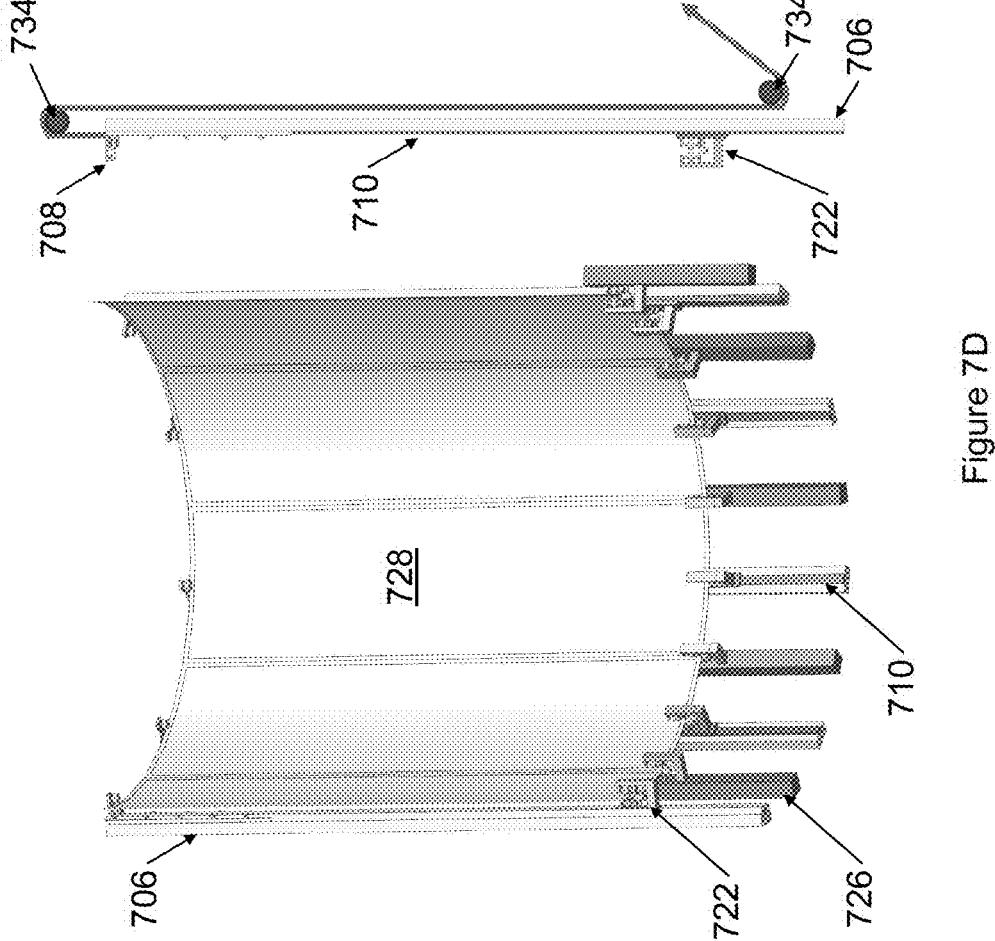

FIG. 6 illustrates a hanging alignment and fixturing configuration in accordance with some embodiments. In many embodiments, the cart 602 couples to the rail 604 with wheels 606. In many embodiments, the wheels 606 have a complementary geometry to the rail. In many such embodiments, the geometry is configured to secure the wheels 606 and coupled cart 602 to the rail 604. In some embodiments, at least one wheel is eccentric and configured to position and align the cart 602 on the rail 604. In many embodiments, the eccentric wheel comprises a wheel with an axle disposed offset relative to the geometric center of the wheel. In many such embodiments, the offset "eccentricity" is configured to center the cart 602 on the rail 604. In many embodiments, the bracket 608 comprises through holes 610. In many such embodiments, the through holes are configured for coupling the bracket 608. In some embodiments, the panel 612 is coupled to the bracket 608 with a bolt 614. In some employments, the bolt 614 and bracket hole 610 are configured with complementary threads. In some such embodiments, the bolt 614 is configured so that when threaded through the bracket hole 610, a first end 616 of the bolt applies a force to the panel 612, securing it to the brackets 608. In some embodiments, a retention element 616, such as a nut or a pin, secures the position of the bolt 614 relative to the bracket 608. In some embodiments, a first end of the bolt is configured with a interface surface 618. In some such embodiments, the interface surface 618 is configured to secure the panel 608 without damaging the panel surface such as with a soft material or by distributing the force over an area. In many embodiments, the bracket 608 and cart 602 can be selectively coupled. In many embodiments, a retention element 616, such as a bolt or a pin, secures the bracket 608 to the cart 602. In some embodiments the panel 612 is configured to use an inner edge of bracket 620 as a datum. In many such embodiments the panel 612 and bracket edge 620 are configured to minimize height mismatch between panels 612. In many embodiments, the "shower curtain" arrangement is further configured so that a welding or joining device could be configured for a starting point regardless of the height of the panels 612.

FIGS. 7A through 7D illustrate a clamping alignment and fixturing configuration in accordance with some embodiments. In some embodiments, alignment towers 702 secure panels in place in the joining area with clamps 704. Many embodiments comprise a constraint tower 706 that is configured to secure and align panels. In many embodiments, the constraint tower 706 comprises at least one upper roller 708 configured for supporting, manipulating, and positioning panels. In many such embodiments, the upper roller 708 is configured for large gross adjustments. In many embodiments, the upper roller 708 is configured to couple to the constraint tower 706 at multiple locations. In many such embodiments, the upper roller 708 is coupled to a rail 710 and configured to translate along the rail 710. In many embodiments, the upper roller 708 is configured to couple to the constraint tower 706 at lugs 712 positioned at set heights. In many such embodiments, the upper roller 708 is configured to couple to the lugs 712 with a ball lock 714 to lock the roller height. In many embodiments, the lug 712 heights correspond to different panel lengths. In many embodiments, the upper roller 708 comprises a wheel 716 configured for securing panels and the translation of panels. In some such embodiments, a roller plate 718 is configured to couple with the upper roller 708 and further constrain the panel with a roller plate wheel 720. In many such embodiments, the plate is disposed between the upper roller wheel 718 and the roller plate wheel 720. In many embodiments, the roller plate 718 is pivotally coupled to the upper roller 708 and configured to move out of the way for panel loading and unloading operations. In many embodiments the lower roller is configured with a first section 722 and second section 722' that are pivotally coupled. In many such embodiments, the second section 722' is configured to move out of the way for panel loading and unloading operations.

In some embodiments, the constraint tower 706 comprises at least one lower roller 722 configured for supporting, manipulating, and positioning panels. In many such embodiments, the lower roller 722 couples to and translates on a rail 710. In many embodiments, the lower roller 722 is positioned on and coupled to the constraint tower 708. In numerous embodiments, the lower roller 722 comprises a plurality of wheels 724 configured to constrain and position the panel. In many embodiments, the lower roller 722 is configured to make fine adjustments to the panel position.

In some embodiments, supplemental constraint towers 726 further support the panels and are configured for the manipulation and positioning of panels. In many embodiments, the supplemental support tower 726 comprises a lower roller 722 that is configured to constrain and align panels. In many such embodiments, the supplemental support towers 726 further comprise a rail 710, and the lower roller 722 is configured to couple to and translate on the rail 710.

In many embodiments, the alignment tower 702 is configured to secure and align panels 728. In many embodiments, the alignment tower 702 is proximal to the joining area and configured to secure a panel 728 in an alignment during joining. In many embodiments the alignment tower 702 is configured with at least one upper roller 708 proximal to a first end. In many embodiments, the alignment tower 702 is configured with at least one lower roller 722 proximal to a second end. In many embodiments, the alignment tower comprises at least one clamp 730 proximal to the first end. In many embodiments, the alignment tower 702 further comprises at least one rail, 710, proximal to the first end. In many such embodiments the at least one clamp 730 is coupled to the at least one rail 710. In numerous embodiments the alignment tower 702 comprises a clamping surface 732 proximal to the first end. In many such embodiments the at least on clamp 730 is configured to clamp a panel 728 between the clamp 730 and the clamping surface 732. In many such embodiments, the clamping surface is composed of a material configured not to mar the clamped panel 728, such as Teflon. In many embodiments the at least one upper roller 708 is at least two upper rollers 708 configured for small positional adjustment relative to each other to correct for panel misalignment. In many embodiments, the at least one lower roller 722 is at least two lower rollers 722 configured for small positional adjustments relative to each other to correct for panel misalignment. In many embodiments, at least one of the roller 708 and 722 is coupled to an adjustment device 734, such as a pulley, jack screw, or electric hoist. In many such embodiments, the adjustment device 734 is configured to translate a coupled roller 708 and 722 on the rail. In many such embodiments, the adjustment device is further configured to align a plate 728 constrained by the rollers 708 and 722 by translating a coupled roller 708 and 722. In some embodiments, more than one upper 708 or lower 722 roller pairs are coupled together with coupling supports 736.

FIG. 8 illustrates a slotted panel alignment and fixturing configuration in accordance with some embodiments. In many embodiments, at least one alignment tower 802 is configured to secure and align panels 804. In many embodiments, the alignment tower 802 is proximal to the joining area, such as the anvil of a FSW device, and configured to secure the panels 804 in an alignment during joining. In many embodiments the alignment tower 802 is configured with at least one upper roller 806 proximal to a first end. In many embodiments, the alignment tower 802 is configured with at least one lower roller 808 proximal to a second end. In many embodiments, the alignment tower comprises at least one alignment bolt 810 proximal to the first end. In many embodiments, the alignment tower 802 further comprises at least one alignment bolt 810 proximal to a second end of the alignment tower 802. In many such embodiments the panel 804 is configured with at least one alignment hole 812. In many embodiments the at least one alignment hole 810 is configured to have a geometry complementary to at least on alignment bolt 810. In many such embodiments, installation of the complementary alignment, bolt 810 will align the panel relative to the joining area and anvil 814. In some embodiments, the alignment hole 812' is configured as a horizonal slot. In many such embodiments, the horizontal slot 812' is configured complementary to a bolt 810 so that the panel can be translated and aligned. In some embodiments, the alignment hole 812" is configured as a clearance hole. In many such embodiments the alignment hole 812" is configured so that the panel 804 can be manipulated relative to a second panel 804'

Figure 9A:
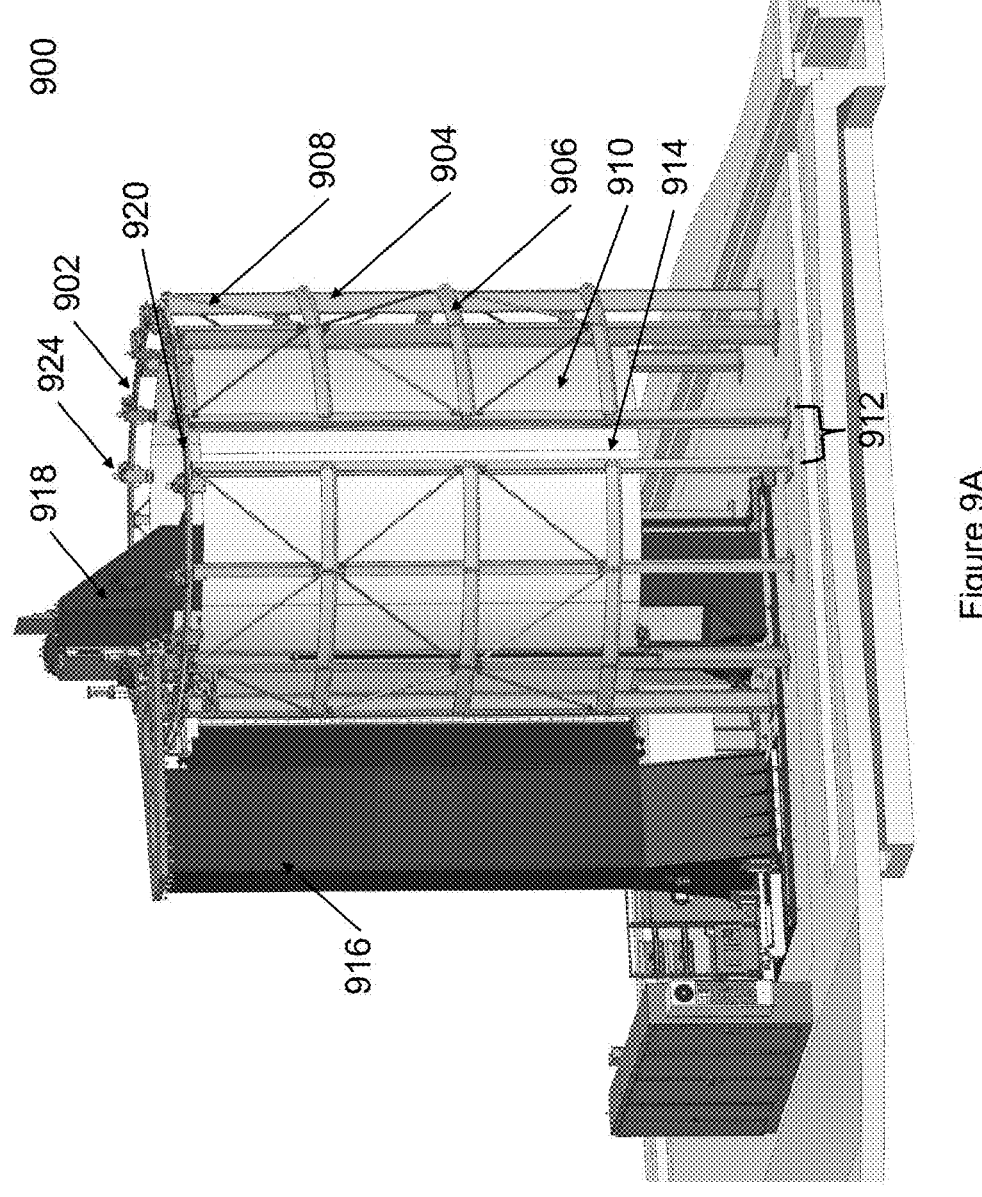
FIGS. 9A and 9B illustrate an example hanging panel alignment and fixturing configuration for friction stir welding in accordance with some embodiments.
Figure 9B:
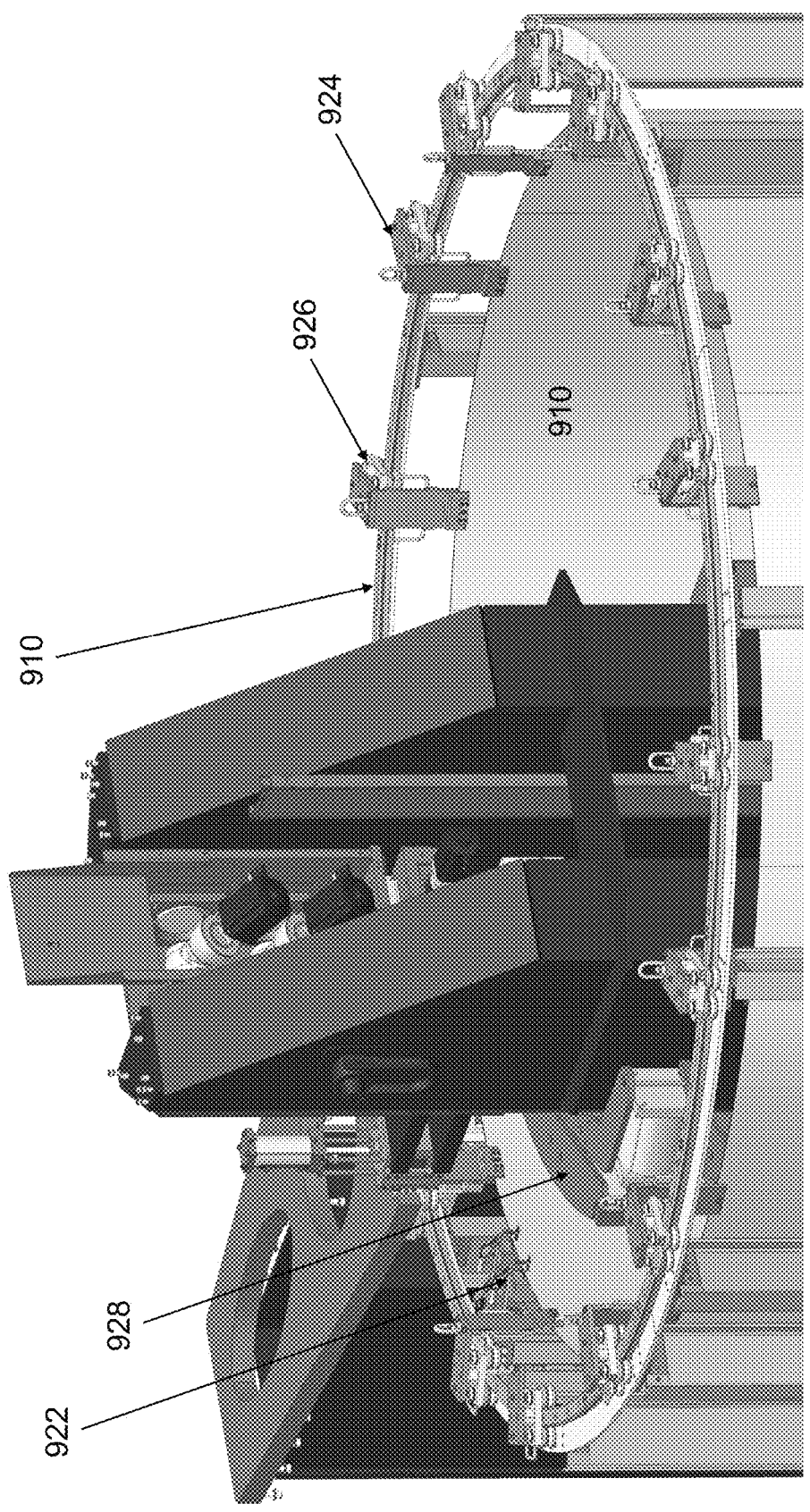

FIGS. 9A and 9B illustrate an example hanging panel alignment and fixturing configuration for friction stir welding in accordance with some embodiments. A rail 902 is installed at the top of a plurality of fixturing support towers 904 at the top of a fixturing structure 900 that contains a joining and aligning area. The fixturing structure 900 is reinforced with support beams 906 and braces 908 configured to resist the forces produced in the joining process and from the weight of the panels 910. The fixturing structure 900 is configured with a seam inspection area 912 in which there are no support beams 906 or bracing 908 so that the full length of the seam 914 between panels 910 can be inspected. The rail 902 at the top of the seam inspection area 912 is configured as a removable section 920 so that the seam 914 can be inspected without obstructions. A FSW system is disposed within the joining area that joins the panels 910 together with a weld head disposed on the weld tower 916 by applying thousands of pounds of force across the panels 910 to an anvil tower 918, to form a weld seam 914 that joins the panels 910. The panels 910 are secured against the anvil tower 918 with weld clamps 928.

Prior to welding, the panels 910 are aligned and constrained. Alignment clamps 922 and alignment brackets 924 secure panels 910 in the joining area. The brackets 924 are coupled to the panels 910 prior to loading the panels 910. The brackets 924 function as a lifting point for a crane for panel 910 installation. The brackets 924 are selectively coupled with carts 926 coupled to the rail 902. Once the brackets 924 are coupled to the carts 926, the hung panel can be translated along the rail 902, which circumscribes the joining area and positioned and aligned in the joining area. Brackets 924 are installed on additional panels 910 that are subsequently coupled to carts 926, aligned with the previously joined panels 910, and joined to form a barrel structure.

Figure 10:
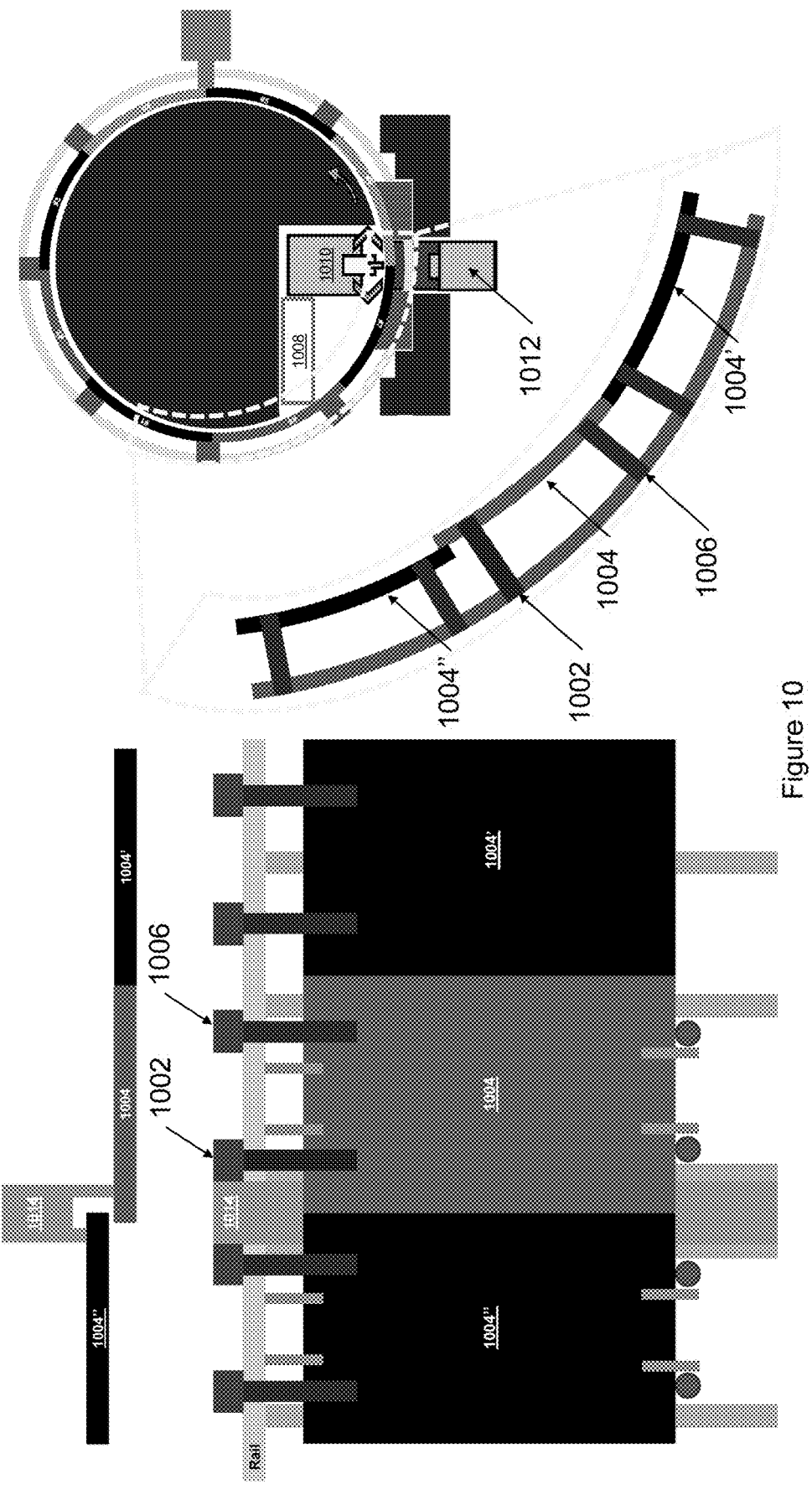
FIG. 10 illustrates aligning and joining the last panel in accordance with some embodiments.

FIG. 10 illustrates aligning and joining the last, or "keystone," panel in accordance with some embodiments. A hanging bracket with an extra offset 1002 is installed on the last panel 1004, along with a normal bracket 1006. When installed and aligned in the joining area 1008, the extra offset bracket 1002 forces the last panel 1004 to overlap with the first panel 1004". The last panel, 1004, is aligned and joined with the weld tower 1010 and weld anvil 1012 to the penultimate panel 1004'. The last panel, 1004, and the first panel, 1004'', are aligned with an offset trim anvil 1014. The offset trim anvil 1014 is utilized to trim the excess material from the last panel 1004, after which the last panel 1004 is aligned and joined to the first panel 1004'' forming a complete barrel structure.

In many embodiments, the system is configured for a barrel with a set diameter. In many embodiments, the system is configured with a barrel comprised of a set number of panels. In many embodiments, the fixtures are configured for panels of a set height. In many embodiments, the system is configured to allow for panels to be loaded and unloaded vertically. In many embodiments, the fixturing structure is configured to account for panel sag. In many embodiments, the system is configured for manual rotation. In many embodiments, the system is configured for manual panel manipulation into and out of the joining area. In some embodiments, the system is configured for automated panel manipulation. In many embodiments, the system is configured for fixturing and alignment adjustments to account for discrete panel sizes. Many embodiments are configured with a rear datum for panel alignment and to avoid depth mismatch. Many embodiments are configured for inspection of all fit-up dimensions, such as gaps, mismatches, and misalignments on the anvil. In many embodiments, the panels are constrained, such as with alignment clamps before the weld clamps are engaged. Many embodiments are configured for fine height adjustment and to close panel height mismatch. Many embodiments are further configured for the location and constraining of stringers against the anvil. In many such embodiments, the system is configured to accommodate panels with preinstalled stringers in the joining area.

Figure 11A:
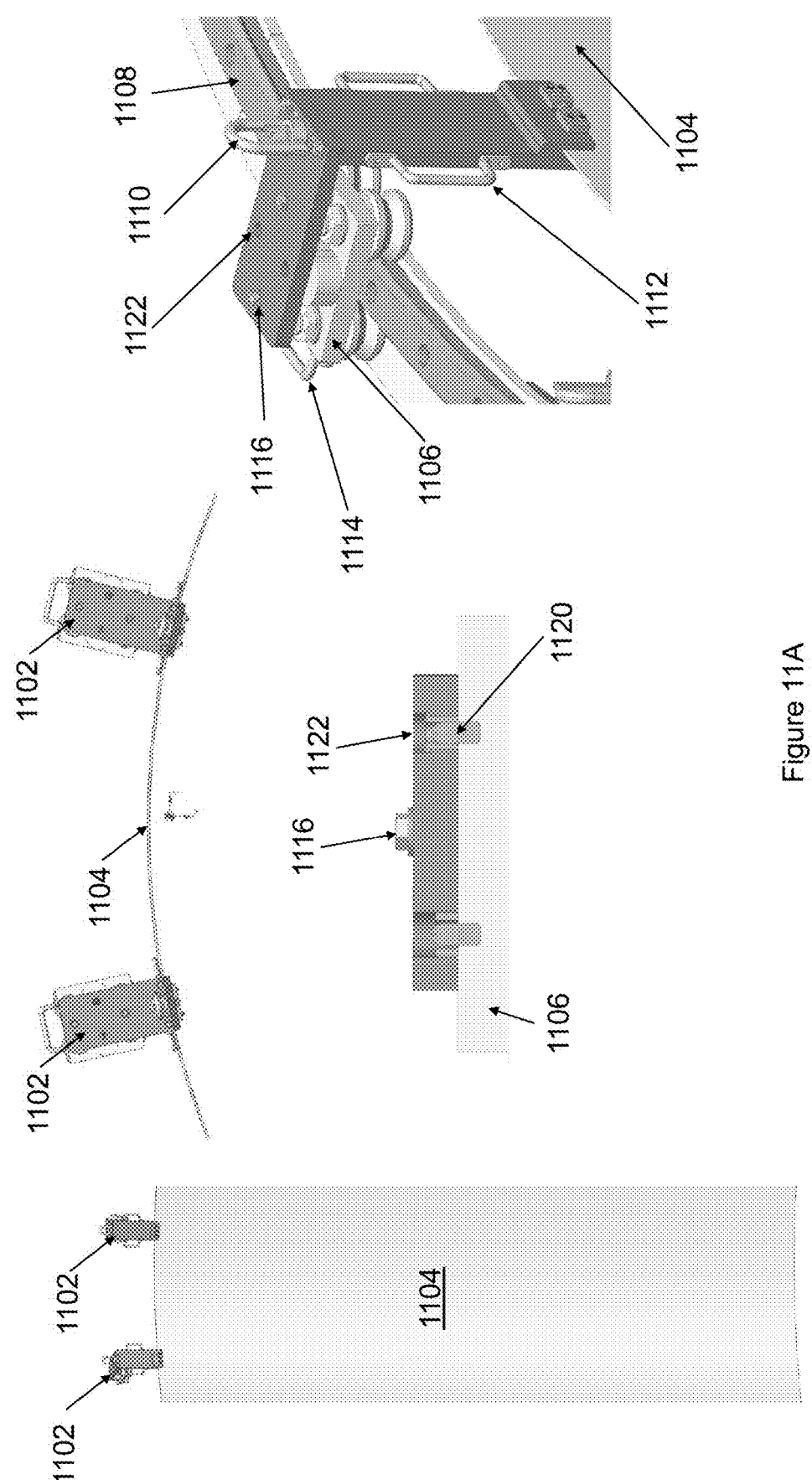
FIGS. 11A and 11B illustrate lifting and alignment brackets in accordance with some embodiments.
Figure 11B:
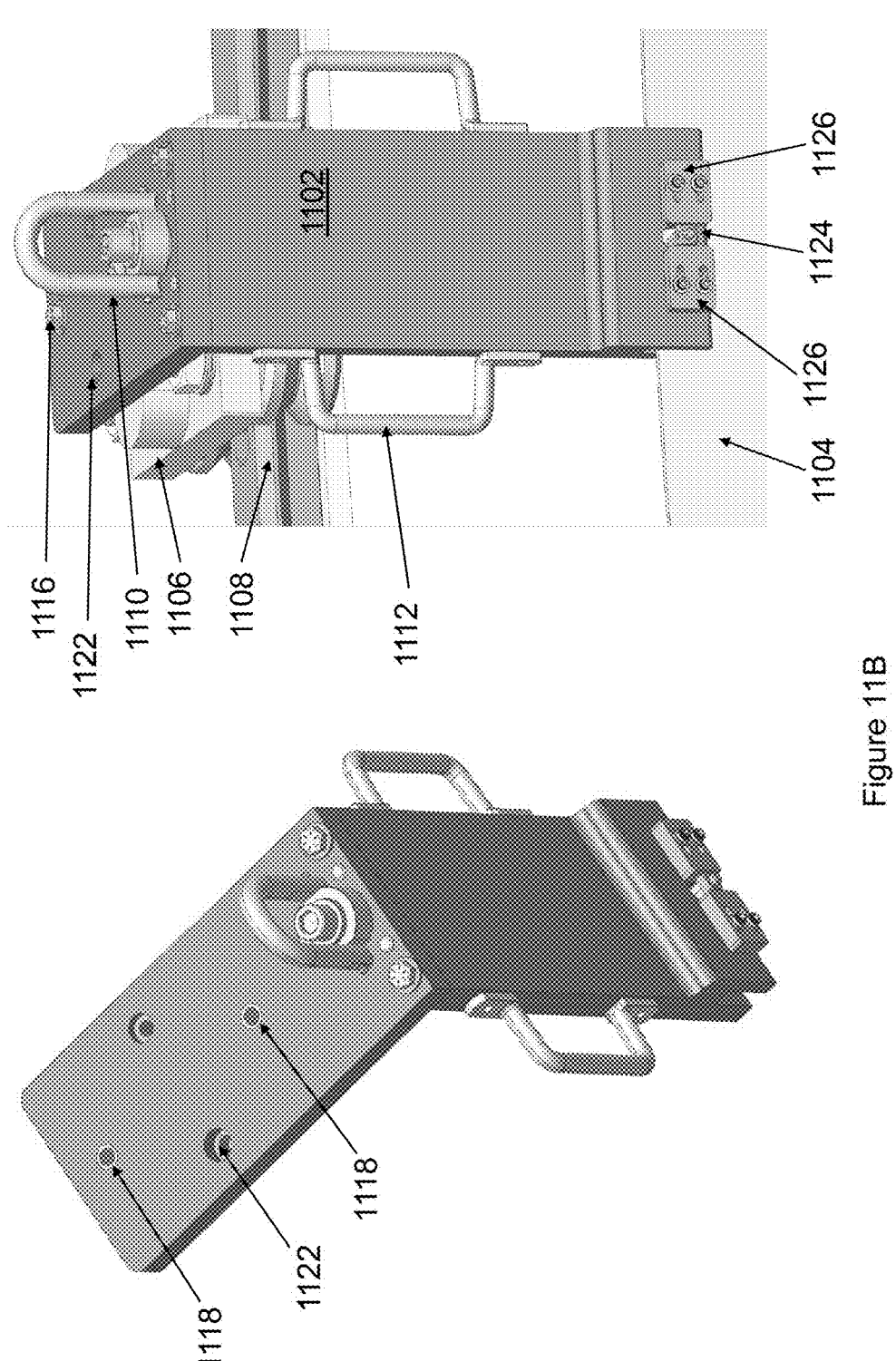

FIGS. 11A and 11B illustrate lifting and alignment brackets in accordance with some embodiments. In many embodiments, at least one bracket 1102 is coupled to each panel 1104. In many embodiments, the at least one bracket 1102 selectively couples to a cart 1106 coupled to and configured to translate along a rail 1108. In many embodiments, the rail 1108 is configured to circumscribe the join area. In many embodiments, the panel 1104 hangs from at least one bracket 1102 and, when coupled to the cart 1106, can translate along the path of the rail 1108 with the coupled cart 1106. In some embodiments, the bracket 1104 is configured with a lifting element 1110 configured to couple with a lifting device. In some such embodiments, the lifting element 1110 is further configured so that a plurality of bracket lifting 1110 elements coupled to a finished barrel can be coupled to a lifting device to support and transport the finished barrel. In many embodiments the brackets 1102 further comprise handles 1112 configured for manual manipulation of the bracket 1102, coupled panel 1104, and couple cart 1106 such as for coupling the bracket 1102 to the cart 1106, and panel 1104 alignment and rotation. In some embodiments, the cart 1106 further comprises a cart handle 1114 configured for manual manipulation of the cart 1106 and any coupled bracket 1102 and panel 1104. In many embodiments, the bracket 1102 is coupled to the cart 1106 with cart bolts 1116 that pass through bracket holes 1118 and fasten to the cart 1106. In many embodiments, the cart 1106 and the bracket 1102 are aligned with alignment pins 1120 and alignment holes 1122 disposed on the cart 1106 and bracket 1102. In many embodiments, the panel 1104 is coupled to the bracket with a panel bolt that passes through the bracket 1102 and panel 1104 and is secured with a panel nut 1124. In many embodiments, the panel nut 1124 is constrained by at least one sliding block 1126 that is configured for aligning the panel relative to the bracket by constraining the panel nut

1124. In some embodiments, the at least one sliding block 1126 is disposed proximal to the panel nut 1124 and comprises geometry configured to prevent rotation of the panel nut 1124.

Figure 12:
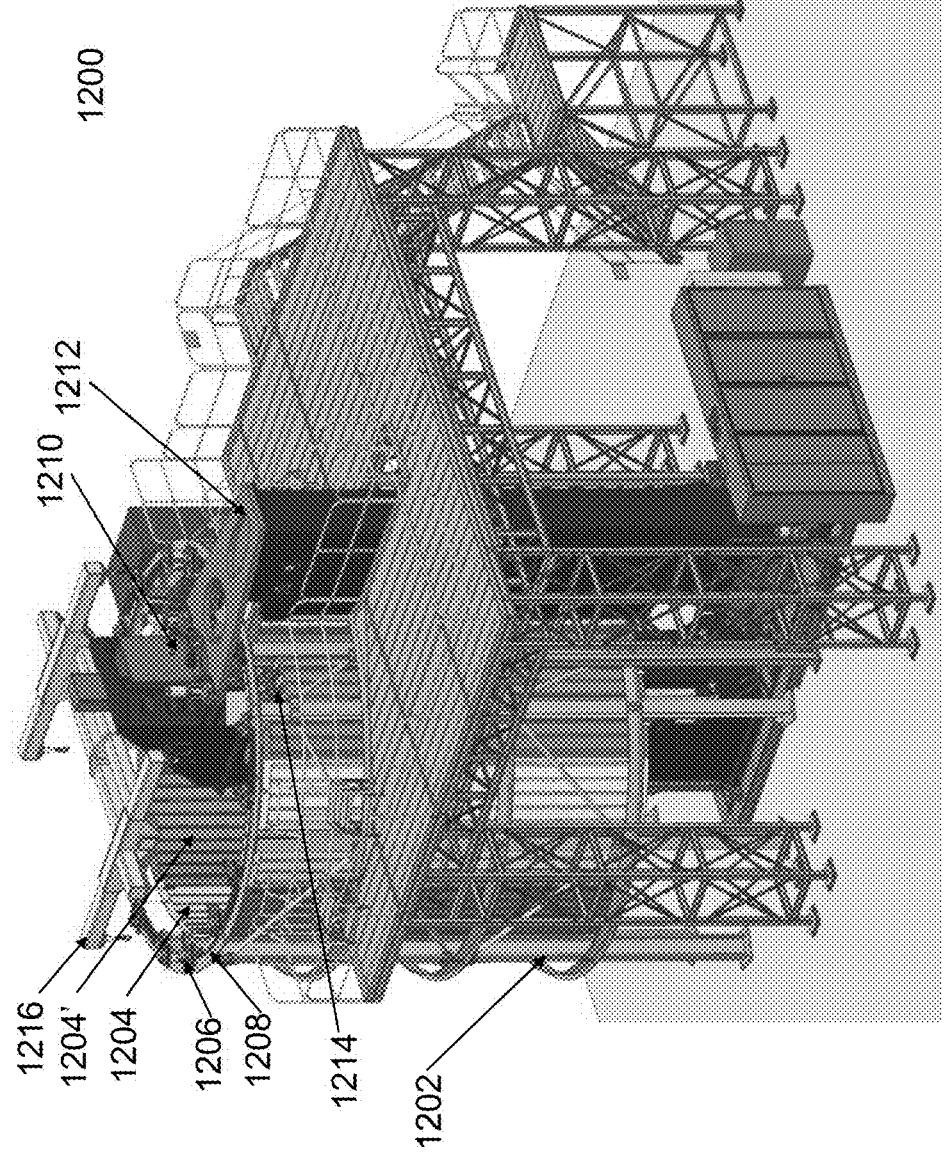
FIG. 12 illustrates an example large panel alignment and assembly apparatus in accordance with some embodiments.

FIG. 12 illustrates an example large panel alignment and assembly apparatus in accordance with some embodiments. A fixturing structure 1200 composing a plurality of support towers 1202 are configured to align, secure, and join a plurality of panels 1204 to form a barrel structure. The plurality of panels 1204 are each coupled to and hung from a bracket 1206 coupled to a rail 1208 is disposed on top of the support towers 1202 and fixture structure 1200. The brackets 1206 and coupled hung panels 1204 translate along the rail 1208, rotating two adjacent panels 1204 and 1204' so that the interface between the panels is located in a joining area between the weld tower 1210 and the anvil tower 1212. The panels are then aligned with the brackets 1206 and clamps 1214 and then welded together. Once all of the panels are welded together, a lift tool 1216 is coupled to several of the brackets 1206, which uncouple from their translation carts and the rail 1208 so that the finished barrel can be removed from the fixture structure 1200.

Figure 13:
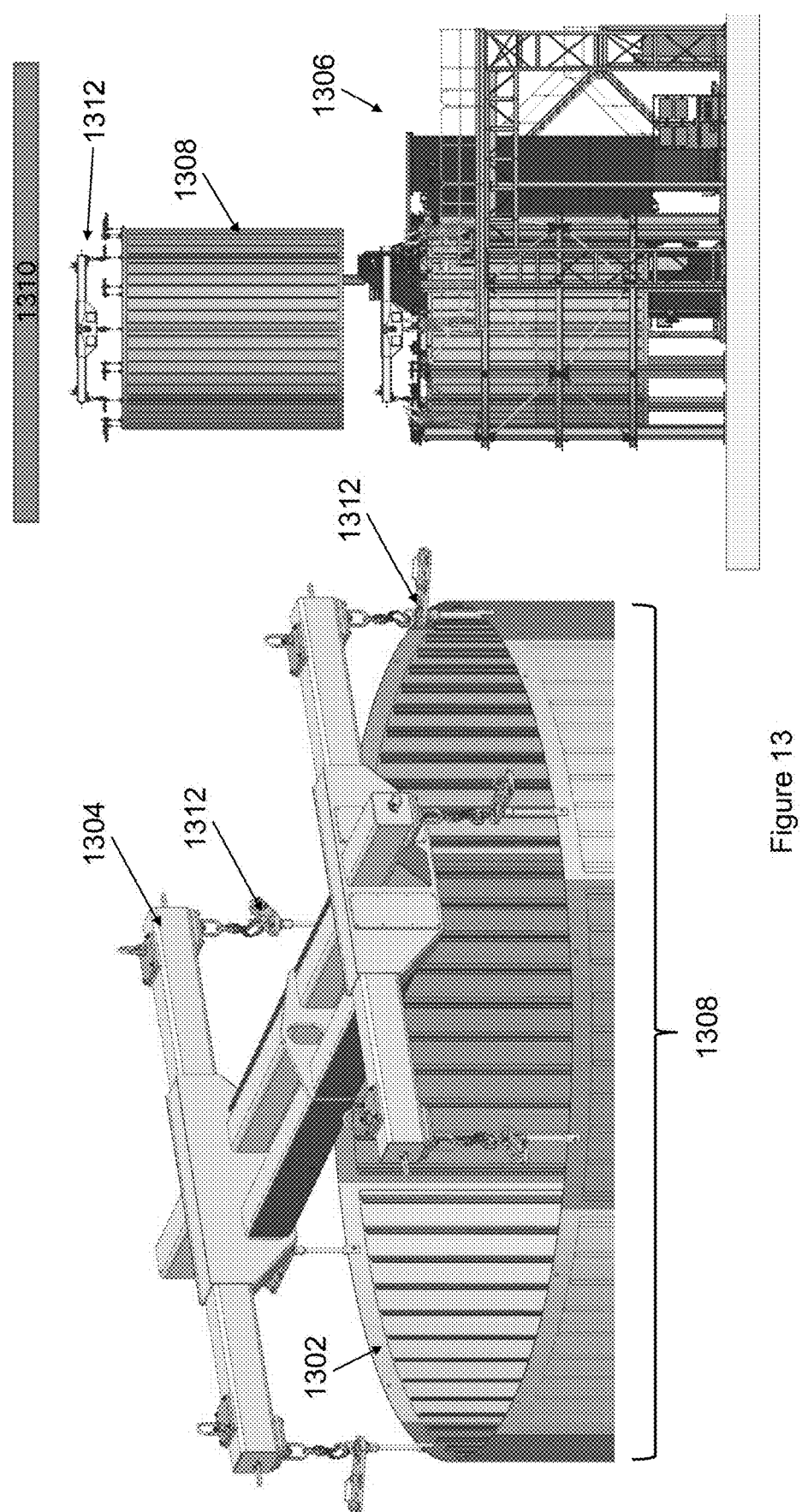
FIG. 13 illustrates the removal of a finished barrel from the fixture structure in accordance with some embodiments.

FIG. 13 illustrates the removal of a finished barrel from the fixture structure in accordance with some embodiments. After all of the panels 1302 have been joined together, a lifting tool 1304 is positioned over the fixture structure 1306, and the finished barrel 1308 is positioned with a bridge crane 1310. The lifting tool 1304 is coupled to the brackets 1312, and the brackets 1312 are uncoupled from the carts, releasing the barrel 1308 from the fixture structure 1306. The crane 1310 then lifts the lifting tool 1304, coupled brackets 1312, and finished barrel 1308 from the fixture structure 1306.

Figure 14:
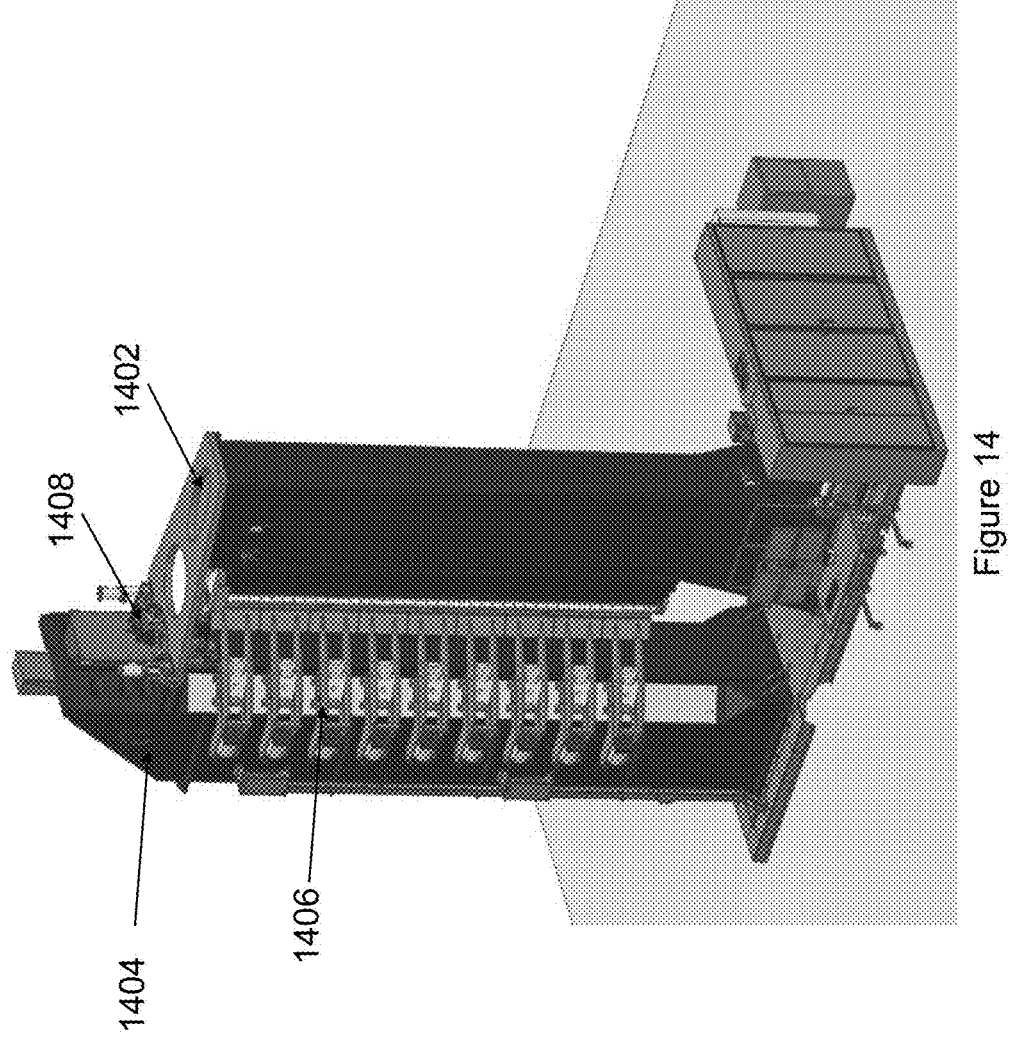
FIG. 14 illustrates an example friction stir welding tower in accordance with some embodiments.

FIG. 14 illustrates an example friction stir welding tower in accordance with some embodiments. A joining area is disposed between the anvil tower 1402 and the welding tower 1404. Once the panel interface is aligned and secured in the joining area. Weld clamps 1406 clamp the panel in place for the welding operation. The welding head then rotates and applies thousands of pounds of force at the interface welding the two panels together. The welding head 1408 traverses the length of the panels, rotating, stirring, and pushing the plates into the anvil 1402 across the length of the panel, welding them together.

Figure 15:
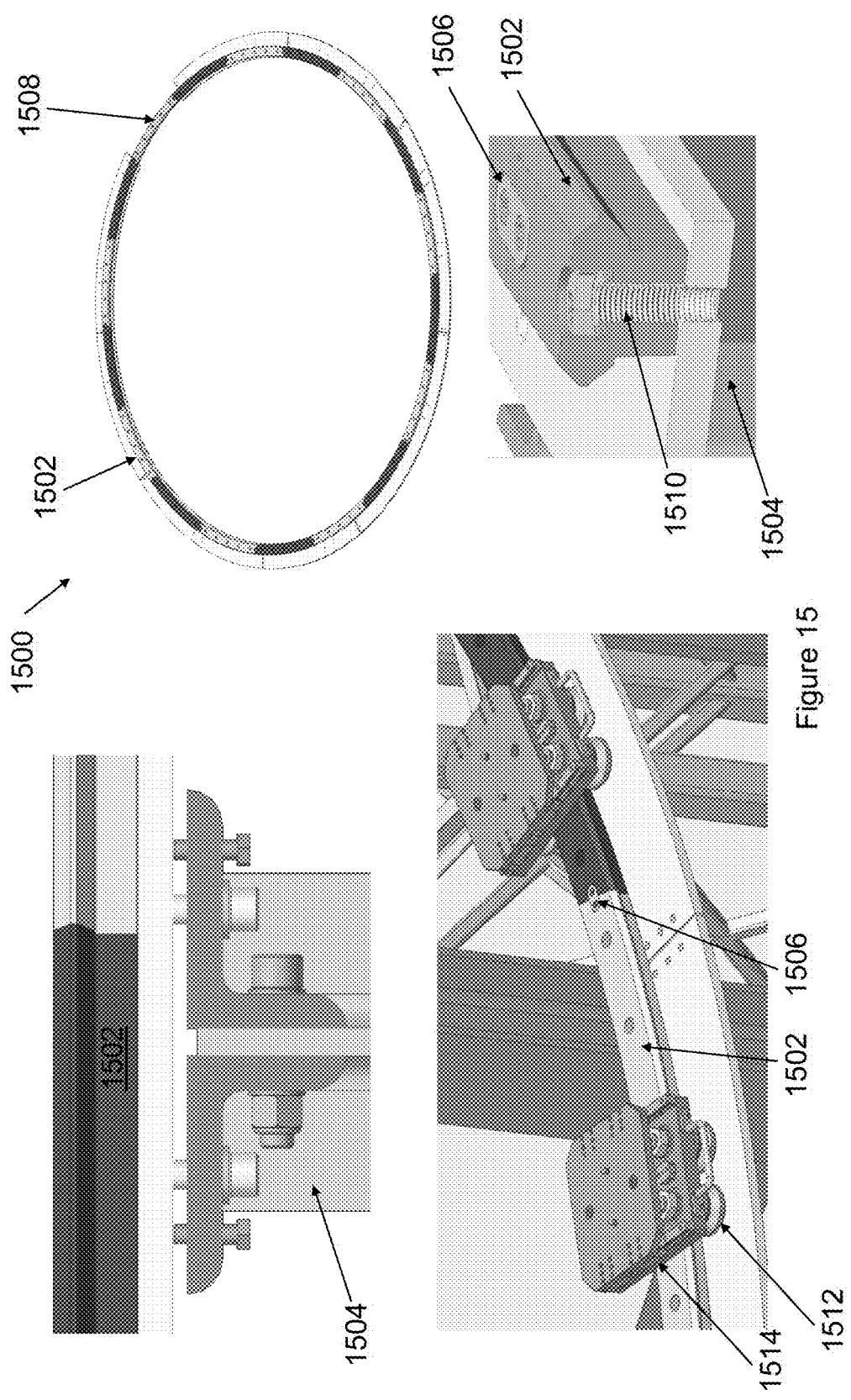
FIG. 15 illustrates an example circular rail in accordance with some embodiments.

FIG. 15 illustrates an example circular rail in accordance with some embodiments. Rail segments 1502 are disposed on support towers 1504 of the fixture structure. Multiple rail segments 1502 are aligned with alignments elements 1506 forming a circular rail track 1500. The circular track 1500 circumscribes the joining area. A removable section 1508 of the rail track provides an inspection area free of obstruction when removed. The circular rail track 1500 is coupled to the support towers 1504 and fixture structure with bolts 1510. The rail track segments 1502 have a geometry complementary to the cart wheels 1512 enabling the cart 1514 to couple to and translate along the rail track 1500.

Figure 16:
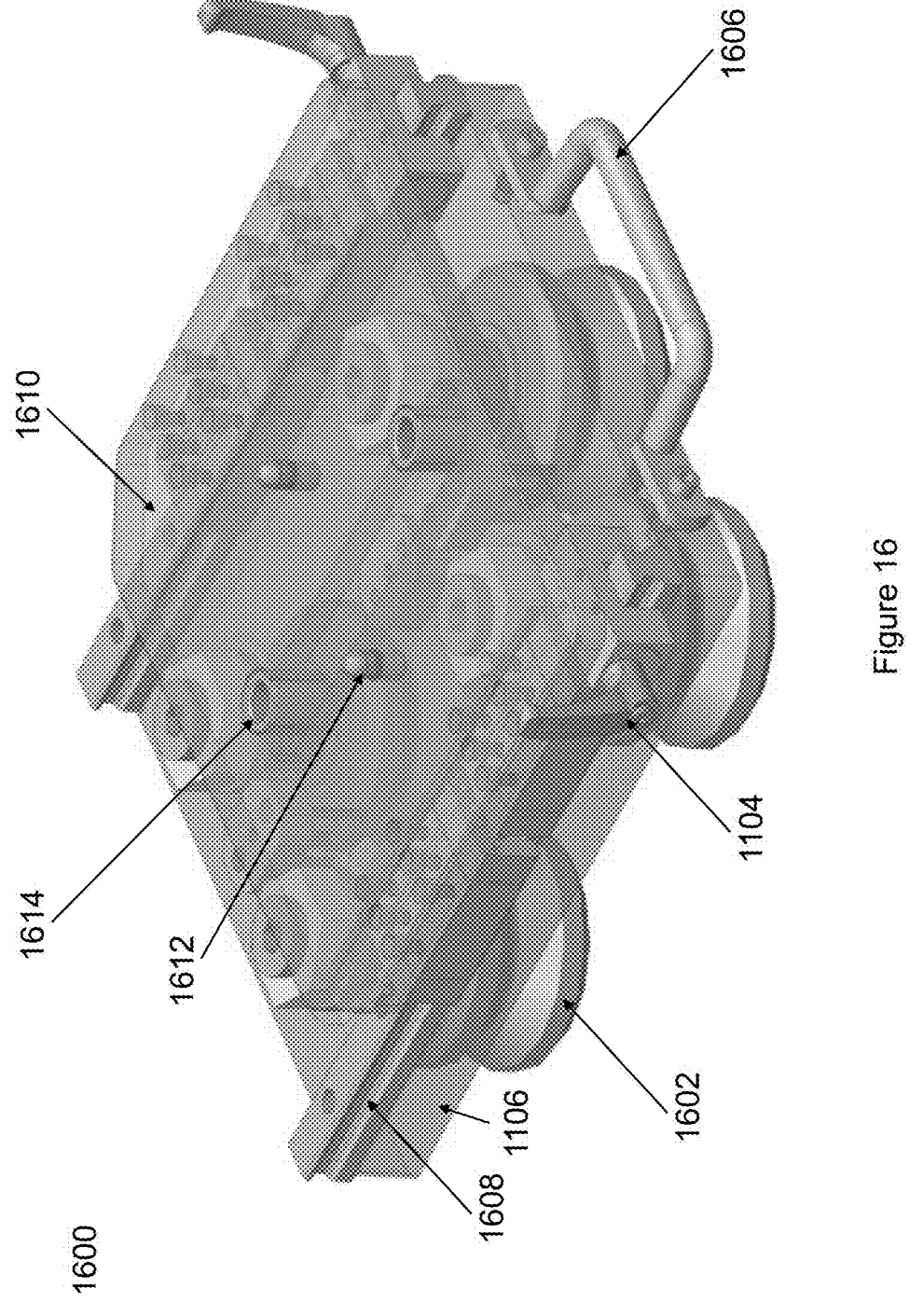
FIG. 16 illustrates an example cart in accordance with some embodiments.

FIG. 16 illustrates an example cart in accordance with some embodiments. Cart wheels 1602 with a complementary geometry to the rail couple the cart 1600 to the rails of the fixture structure. The wheels 1602 are coupled to a cart base 1604. A handle 1606 is disposed on cart base 1604 to facilitate manipulation of the cart 1660 and manual translation of the cart 1600 along the rail. Linear rails 1608 are disposed on the surface of the cart base 1604. The linear rails 1608 are coupled to a sliding cart surface 1610, upon which the bracket can couple. Brakes can be utilized to lock the relative position of the cart base 1604 and the sliding surface

1610. Alignment pins 1612 are disposed on the sliding surface 1610 to facilitate the alignment of brackets with the sliding surface 1610. Threaded holes 1614 are disposed in the sliding surface 1610 to enable coupling of brackets to the sliding surface 1610 with bolts.

Figure 17C:
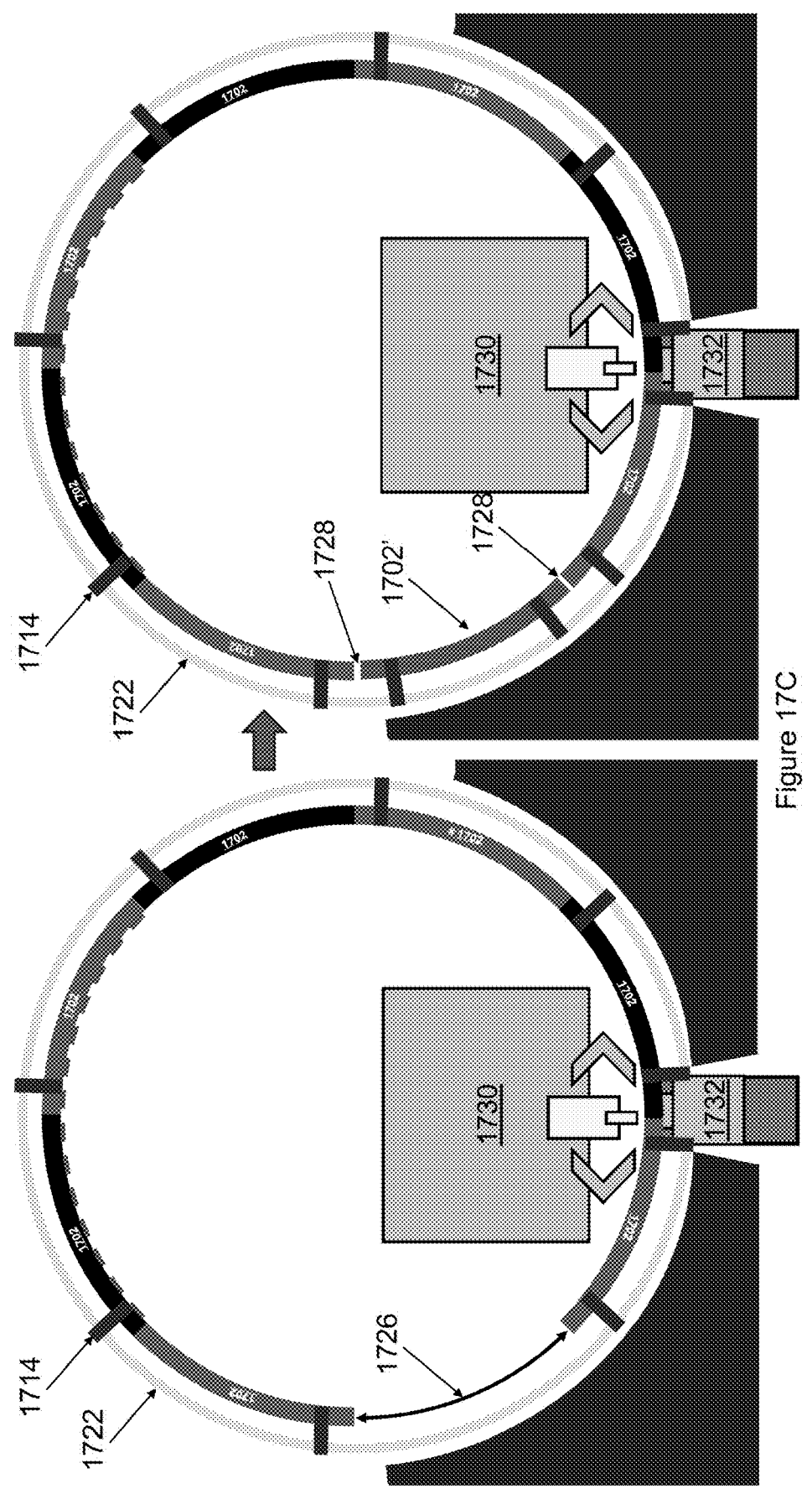

FIGS. 17A through 17C illustrate loading and aligning panels and brackets in accordance with some embodiments. In an example embodiment panels 1702 are coupled to brackets 1704 and are secured with a retention pin 1706. A lifting rig 1708 is coupled to the swivel ring hoist 1710 coupling point on the bracket 1704, and a crane lifts the bracket 1704 and coupled panel 1702 into the fixture structure. Operators then grip the bracket handles 1712 to manipulate the bracket 1704 onto a cart 1714. Alignment pins 1716 in the cart 1714 align the cart 1714 with alignment holes 1718 in the bracket 1704. Bolts 1720 couple and secure the bracket 1704 to the cart 1704. The coupled panel 1702 can be aligned with multiple degrees of freedom. The coupled panel 1702 hangs from the bracket 1704 and can be lifted vertically at the coupling point 1710. The panel 1702 can swivel and rotate about the coupling point 1710. The panel 1702 can be translated along the rail 1722. The rail 1722 circumscribes the joining area. The panel 1702 can be translated along the cart linear rails 1724. The ability to manipulate in multiple directions makes the system capable of producing different barrel diameters without changing the fixture. Sliding the panels in and out radially, for example by adjusting the position of each cart on its respective cart linear rails, forms a "moving iris" fixture that can accommodate multiple barrel diameters. For example, FIG. 17B illustrates a barrel 1736, a "stretched" barrel diameter 1736' and a "shrunk" barrel diameter 1736". These barrels of different sizes overlap at tangent point 1734 located in the joining area. The tangent point 1734 coincides with the weld tower 1730 and anvil 1732, enabling panels to join together over a range of target barrel diameters. The welding occurs consistently at the radially-fixed tangent point 1734, regardless of the barrel's diameter. Given the radial fixity of tangent point 1734, and an initial barrel 1736 size, a smaller shrunk barrel 1736" can be produced by positioning each cart incrementally inward with increasing circumferential distance from the tangent point 1734. Contrariwise, a larger stretched barrel 1736' can be produced by positioning each cart incrementally outward with increasing circumferential distance from the tangent point 1734. Although only a stretched diameter 1736' and a shrunk diameter 1736" barrel are depicted, it should be understood that a continuous range of barrel diameters between a minimum diameter and a maximum diameter can be produced.

In many embodiments, the installation of the keystone panel 1702' is facilitated by the moving iris; that is, by the ability of carts to be repositioned radially on their cart linear rails. The moving iris "stretches" the diameter of the incomplete barrel by translating the coupled panels 1702 outward radially. The outward translation increases the diameter formed by the coupled panels 1702. The translated carts 1714 can be locked in place at the expanded diameter, creating a barrel gap 1726 in the incomplete barrel that is larger than the keystone panel 1702'. The keystone panel 1702' can then be installed in the barrel gap 1726 with nominal gaps 1728 between the keystone panel 1702' and the adjacent coupled panels 1702 of the incomplete barrel. The penultimate panel of coupled panels 1702 and the keystone panel 1702' can then be translated along the rail 1722 to the joining area between the welder tower 1730 and anvil 1732 to be joined together. When the carts 1714 are released, the barrel diameter can be "shrunk" to close the gap 1728 between the first panel of coupled panels 1702 and the keystone panel 1702' to form the nominal diameter of the barrel. The first panel and the keystone 1702' panel are then positioned in the joining area, aligned, and joined, completing the barrel.

Figure 18A:
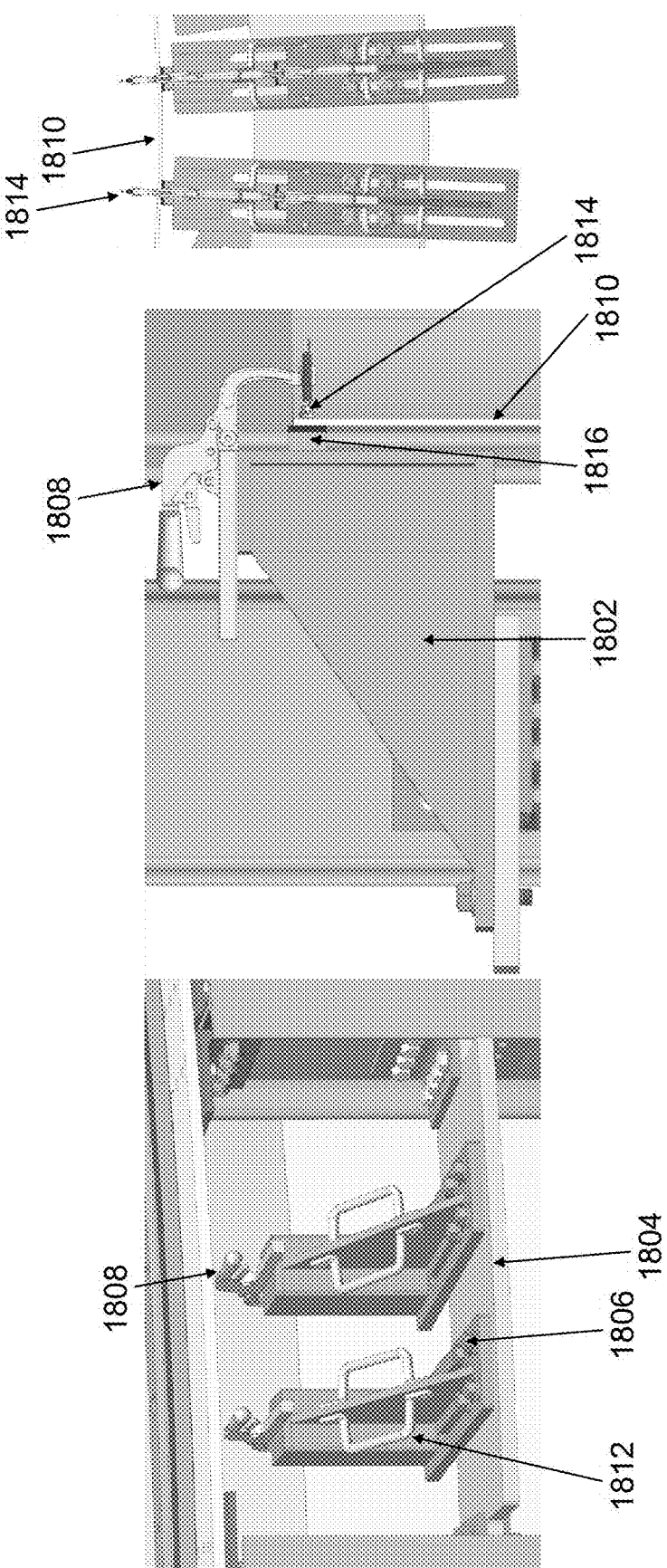
FIGS. 18A and 18B illustrate example upper clamps in accordance with some embodiments.
Figure 18B:
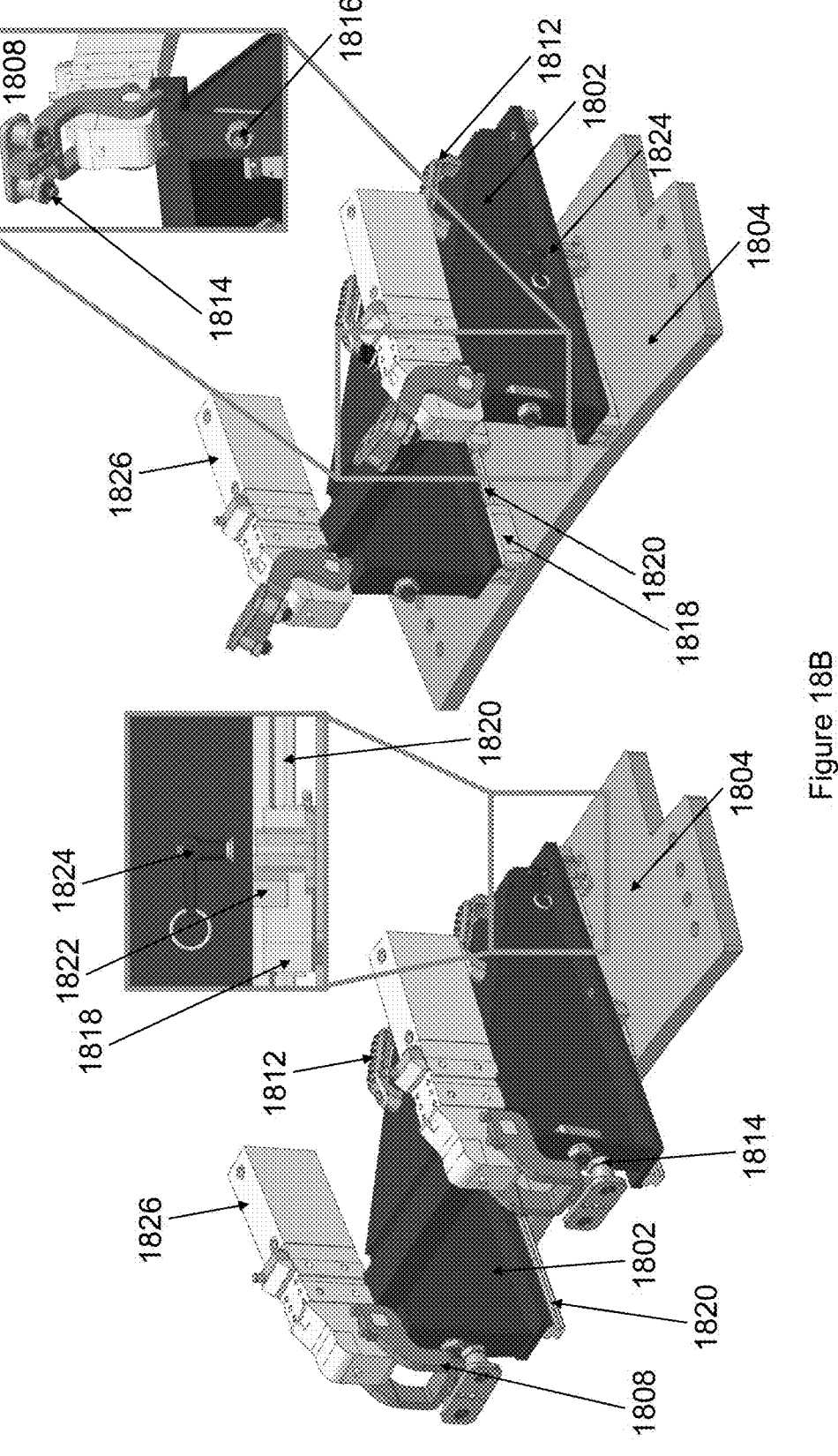

FIGS. 18A and 18B illustrates upper clamps in accordance with some embodiments. FIG. 18A illustrates an example of an upper clamp with a slider weldment 1802 coupled to the fixture structure 1804 with holding bolts 1806. The weldment 1802 can be slid forward and backward to align the hold down clamp 1808 with the panel 1810. Handles 1812 are disposed on the weldment 1802 to facilitate sliding the weldment and aligning the hold down clamps 1808. Once the weldment 1802 is properly aligned, the bolts 1806 secure the hold down clamp 1808 positions relative to the panel 1810. Once the panel 1810 is aligned, the hold down camp 1808 can be engaged securing the panel 1810 between the clamp interface 1814 and a weldment interface 1816 configured to prevent the panels from being marred.

FIG. 18B illustrates example upper clamps in accordance with another embodiment. A slider weldment 1802 is coupled to a bearing cart 1818 that can translate on a bearing rail 1820 that is coupled to the fixture structure 1804. The weldment 1802 can be slid forward and backward to align the hold down clamps 1808. A stop 1822 limits the amount of travel to a set position. A locking pin 1824 secures the slider weldment 1802 at set positions. Handles 1812 are disposed on the weldment 1802 to facilitate sliding the weldment 1802 and aligning the hold down clamps 1808. Once the weldment 1802 is properly aligned, the set pin 1824 secures the clamp 1808 positions relative to the fixture structure 1804. The hold down camps 1808 are engaged by an actuator 1826 securing the panel between a clamp interface 1814 and a weldment interface 1816.

Figure 19:
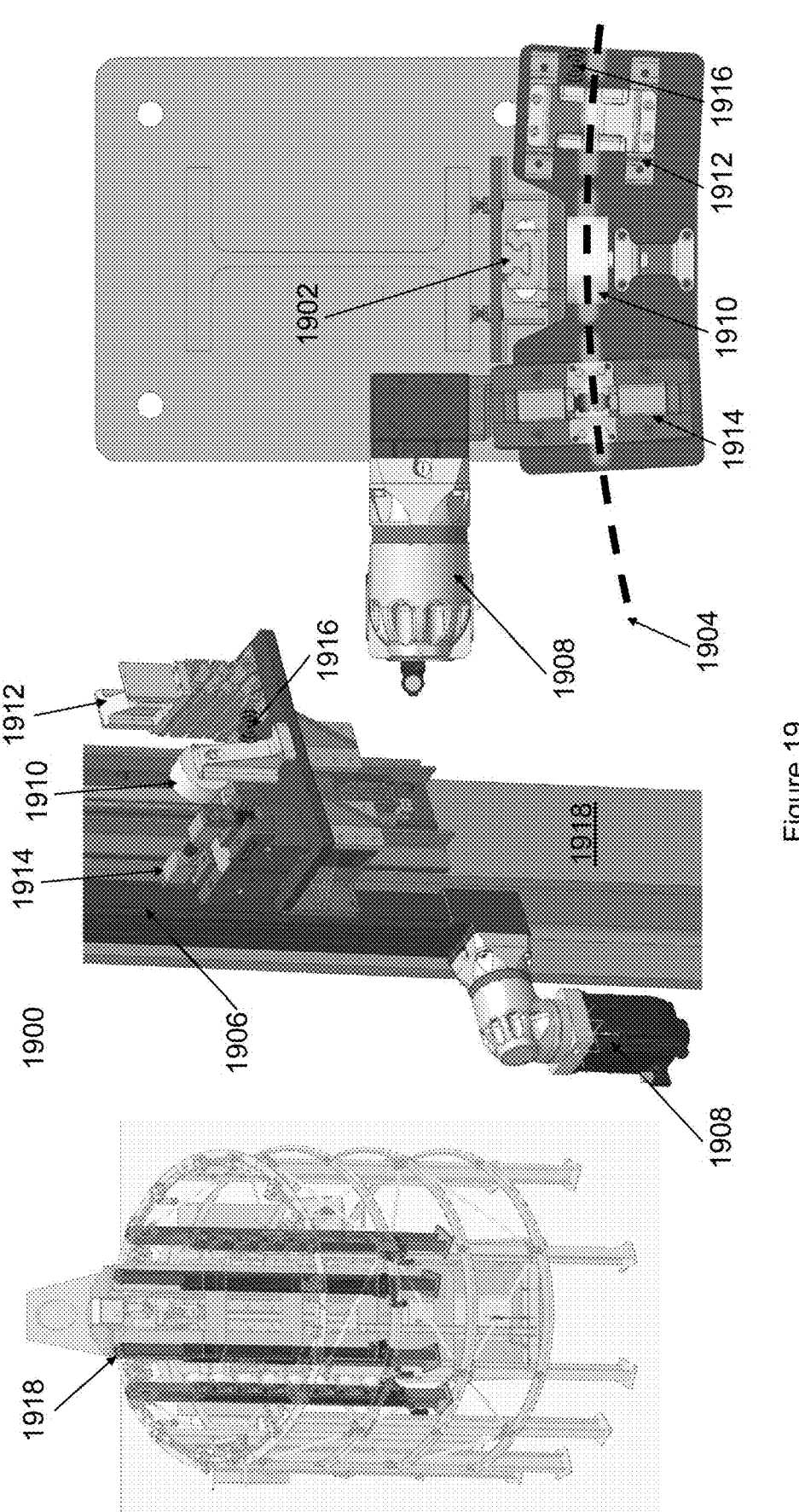
FIG. 19 illustrates example lower clamps in accordance with some embodiments.

FIG. 19 illustrates an example lower clamp assembly in accordance with some embodiments. The lower clamp assembly 1900 is disposed on the alignment tower 1918 and is configured to translate up and down on a linear rail 1902 and enable precise control to tilt, adjust, and align the panels 1904. Each clamp assembly 1900 has an independent drive train 1906, so it can manipulate and align the panel independently of the other clamps. The motor 1908 can "jog" the panel 1904 to a known location or can be manually controlled for precise panel alignment. The clamp assembly can be translated up and down to accommodate multiple barrel and panel sizes. When not needed for an operation, the clamp assembly 1902 can be lowered or actuated out of the way. A roller 1910 is disposed on the clamp assembly 1902 to facilitate the manipulation and alignment of the panels. When the motor 1908 executes a jog, the clamp assembly translates a predetermined jog distance, and the roller 1910 engages the panel 1904 to accurately align the panel in the correct position. The lower clamps 1914 are designed to move individually or as a pair per panel. A "V" block 1912 provides a contact point when manipulating and aligning the panels to restrain the panel positionally and react to lateral loading. When the panel is properly aligned, the clamps 1914 actuate to secure the panel in its alignment. A panel sensor 1916 may optionally be included, for sensing the presence of a panel above lower clamp assembly 1900, upon roller 1910, or within "V" block 1912 or lower clamps 1914. Upon sensing a panel, motion of lower clamp assembly 1900 may be stopped to avoid collision, or to complete a clamping operation.

FIG. 20 illustrates an example removable rail section in accordance with some embodiments. The fixturing structure 2002 is configured with a seam inspection area 2004 in which there are no support beams or bracing so that the full length of the seam between panels can be inspected. The rail 2006 at the top of the seam inspection area 2004 is configured as a removable rail section 2008 so that the seam can be inspected without obstructions. The removable rail section 2008 is configured to actuate out of the way to eliminate clearance issues between the upper rail and the inspection system. A pneumatic-actuated table weldment 2010 pushes the track segment 2008 out of the way. The actuation is controlled by pneumatic actuators 2012 that move the rail 2008 to clear the inspection area 2004. Liner rails 2014 ensure repeatability and that the removed rail 2008 is returned to the original position. A cart sensor 2016 may optionally be included, for sensing the presence of carts upon removable rail section 2008, or near enough to removable rail section 2008 to interfere with its actuation out of the way. Upon sensing a cart, actuation of removable rail section 2008 may be halted to avoid interference.

Figure 21:
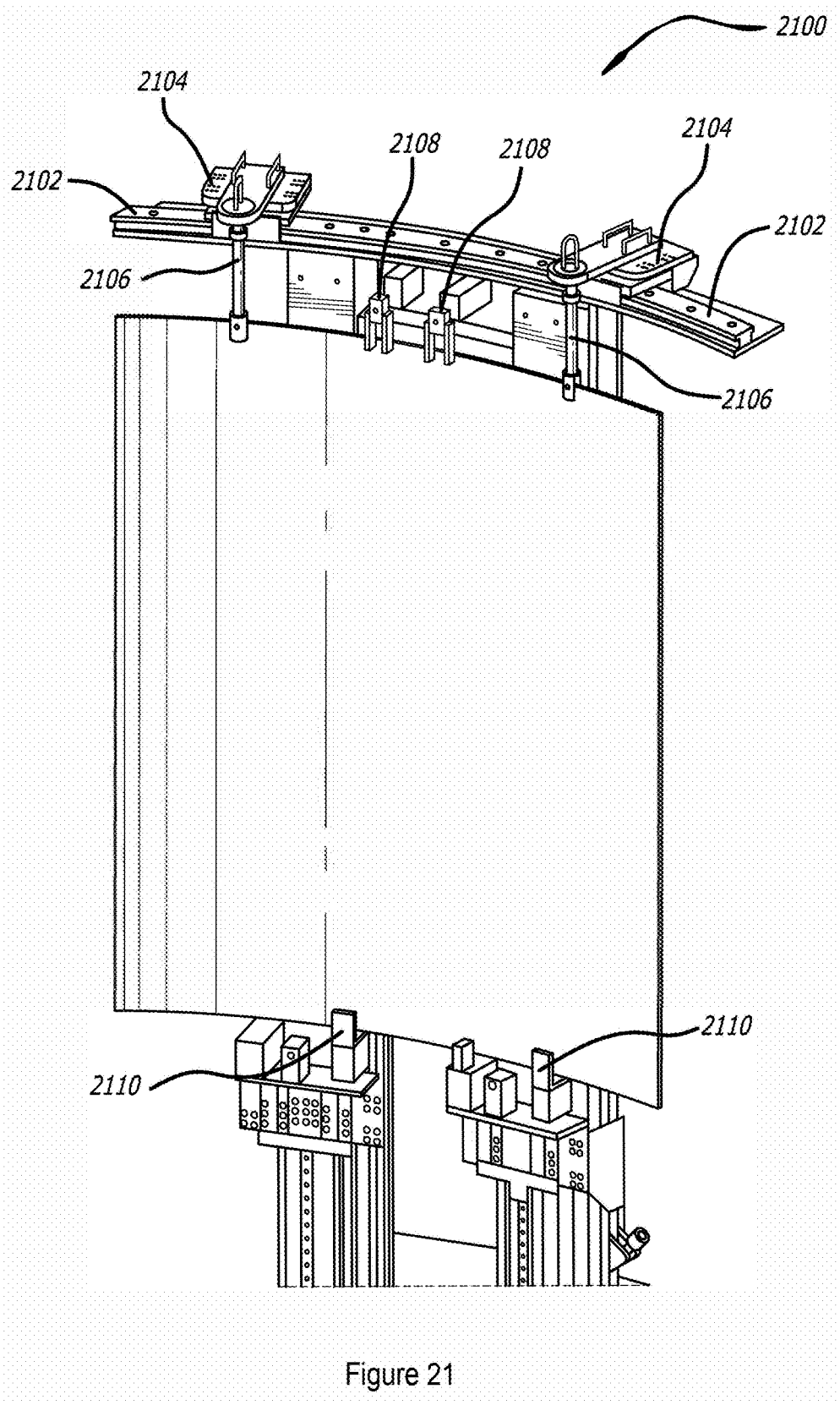
FIG. 21 illustrates an example hanging panel alignment and fixturing configuration for friction stir welding in accordance with an embodiment.

FIG. 21 illustrates an example hanging panel alignment and fixturing configuration 2100 for friction stir welding that incorporates the rail 2102 configuration illustrated in FIG. 15, the cart 2104 configuration illustrated in FIG. 14, the brackets 2106 configuration illustrated in FIG. 17B, the upper clamp 2108 configuration illustrated in FIG. 18B, and the lower clamp 2110 configuration illustrated in FIG. 19, and described above.

Although specific embodiments of the invention have been described and illustrated, the invention is not to be limited to the specific forms or arrangements of parts so described and illustrated. The scope of the invention is to be defined by the claims appended hereto and their equivalents.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

What is claimed is:

1. A panel alignment and assembly apparatus comprising:
   a fixturing structure comprising a plurality of support towers and at least one alignment tower wherein the at least one alignment tower comprises a constraint system configured to constrain and align a plurality of panels;
   a joining device and the at least one alignment tower disposed within a joining area;
   a rail disposed on the fixturing structure at a set height and configured to circumscribe the joining area;
   a plurality of carts coupled to the rail and configured to translate along the rail;
   a plurality of brackets, wherein each bracket is configured to couple to one of the plurality of panels and a cart, and to align the coupled panel relative to the joining device when the coupled panel hangs from the bracket,
   wherein the constraint system comprises a plurality of clamps including at least one upper clamp disposed on an upper portion of the alignment tower and at least one lower clamp disposed on a lower portion of the alignment tower and wherein the at least one upper clamp and the at least one lower clamp are configured to align and secure one of the plurality of panels therebetween.

2. The apparatus of claim 1, wherein each of the plurality of brackets is configured to selectively couple to one of the plurality of carts.

3. The apparatus of claim 1 wherein each of the plurality of brackets is further configured with a mounting point configured to couple with a manipulation device, the manipulation device being configured to manipulate both the coupled bracket and the panel coupled thereto.

4. The apparatus of claim 1, wherein the cart couples to the rail via a plurality of wheels, at least one of which is an eccentric wheel configured to position and align the cart relative to the rail.

5. The apparatus of claim 4, wherein the rail and the plurality of wheels are configured with complementary geometries that secure the cart to the rail.

6. The apparatus of claim 1, wherein each of the plurality of brackets comprises at least one through-hole configured to receive a bolt and couple the bracket to at least one of: one of the plurality of carts and one of the plurality of panels.

7. The apparatus of claim 1, wherein the at least one lower clamp is at least two lower clamps and each clamp is configured to translate up and down independently tilting the panel to align the panel.

8. The apparatus of claim 1, wherein the rail comprises at least one removable section of rail configured to articulate from a first position to a second position.

9. The apparatus of claim 1 wherein each of the carts is further configured to translate radially relative to the joining area.

10. The apparatus of claim 6, further comprising a retention element configured to secure the bolt.

11. The apparatus of claim 1, wherein the at least one upper clamp is in connection with at least one upper roller, wherein the at least one upper roller is configured to translate up and down the constraint system.

12. The apparatus of claim 1, wherein the at least one lower clamp is in connection with at least one lower roller, wherein the at least one lower roller is configured to translate up and down the constraint system.

* * * * *